US010850694B2

(12) United States Patent
Kashiwazaki et al.

(10) Patent No.: US 10,850,694 B2
(45) Date of Patent: Dec. 1, 2020

(54) VEHICLE REAR BUMPER

(71) Applicant: HONDA MOTOR CO., LTD., Tokyo (JP)

(72) Inventors: Dai Kashiwazaki, Wako (JP); Taikichi Moriya, Wako (JP); Shigeki Hirota, Haga-gun (JP)

(73) Assignee: HONDA MOTOR CO., LTD., Tokyo (JP)

(*) Notice: Subject to any disclaimer, the term of this patent is extended or adjusted under 35 U.S.C. 154(b) by 137 days.

(21) Appl. No.: 16/296,269

(22) Filed: Mar. 8, 2019

(65) Prior Publication Data
US 2019/0308575 A1 Oct. 10, 2019

(30) Foreign Application Priority Data

Apr. 9, 2018 (JP) .................................. 2018-074575

(51) Int. Cl.
B60R 19/04 (2006.01)
B60R 19/18 (2006.01)
B60R 19/24 (2006.01)
B62D 43/04 (2006.01)

(52) U.S. Cl.
CPC ............. *B60R 19/04* (2013.01); *B60R 19/18* (2013.01); *B60R 19/24* (2013.01); *B62D 43/04* (2013.01)

(58) Field of Classification Search
CPC ............... B60L 2200/26; Y02T 10/645; Y02T 10/7275; A01M 7/0075; B60G 2400/104; H01L 2924/00014; H01L 2924/00; H01L 2224/32225; H01L 2224/45015; H01L 2224/48465
See application file for complete search history.

(56) References Cited

U.S. PATENT DOCUMENTS

| 1,464,321 | A | * | 8/1923 | Koester | ................ | B60R 19/285 |
| | | | | | | 293/153 |
| 2,672,363 | A | * | 3/1954 | Buchanan | ............... | B60R 19/14 |
| | | | | | | 293/118 |
| 3,588,158 | A | * | 6/1971 | Ford | ...................... | B60R 19/20 |
| | | | | | | 293/107 |
| 4,266,818 | A | * | 5/1981 | Hightower | .............. | B60R 19/14 |
| | | | | | | 188/371 |

(Continued)

FOREIGN PATENT DOCUMENTS

JP 09-104298 4/1997

*Primary Examiner* — Kiran B Patel
(74) *Attorney, Agent, or Firm* — Amin, Turocy & Watson, LLP

(57) ABSTRACT

A vehicle rear bumper includes a rear bumper face. The rear bumper face includes right and left side face blocks and a middle face block. An outer edge part in the vehicle width direction of the middle face block is fastened and fixed attachably and detachably to the right and left side face blocks. The middle face block has a lower flange that extends in a vehicle body frontward direction from a lower end of a block main body part. Each of right and left edge parts of the lower flange is fastened and fixed to a lower surface of the side face block. In the lower flange, an extension length to the vehicle body frontward direction and a maximum thickness in a vertical direction are gradually increased from a middle region in the vehicle width direction toward a fastening fixation part.

6 Claims, 19 Drawing Sheets

(56) References Cited

U.S. PATENT DOCUMENTS

| | | | | |
|---|---|---|---|---|
| 4,333,674 A * | 6/1982 | Buettner | B60R 19/14 | 293/120 |
| 4,402,537 A * | 9/1983 | Gallitzendorfer | B60R 19/04 | 293/149 |
| 4,817,307 A * | 4/1989 | Hardgrove | B60R 19/48 | 29/401.1 |
| 5,000,499 A * | 3/1991 | Shephard | B60R 19/14 | 188/376 |
| D382,237 S * | 8/1997 | Lund | D12/167 | |
| 5,803,514 A * | 9/1998 | Shibuya | B60R 19/18 | 293/132 |
| 6,042,163 A * | 3/2000 | Reiffer | B60R 19/18 | 293/102 |
| 6,068,807 A * | 5/2000 | Takeuchi | B29C 45/1642 | 264/255 |
| 6,695,368 B1 * | 2/2004 | Weykamp | B60R 19/26 | 293/122 |
| 7,210,717 B1 * | 5/2007 | Baccouche | B60R 19/18 | 293/102 |
| 7,303,219 B2 * | 12/2007 | Trabant | B60R 19/24 | 293/120 |
| 7,703,834 B1 * | 4/2010 | Hardy | B60R 9/06 | 296/102 |
| 8,485,592 B2 * | 7/2013 | Shin | B62D 21/152 | 293/149 |
| 8,985,671 B1 * | 3/2015 | Lei | B60R 19/04 | 296/133 |
| 8,991,903 B1 * | 3/2015 | Alavandi | B60R 19/04 | 296/187.09 |
| 9,114,767 B2 * | 8/2015 | Jeong | B60R 19/18 | |
| 9,399,438 B2 * | 7/2016 | Braunbeck | B60R 19/04 | |
| 9,533,641 B2 * | 1/2017 | Kutscher | B60R 19/18 | |
| 9,610,910 B2 * | 4/2017 | Muskos | B60R 19/18 | |
| 2006/0244274 A1 * | 11/2006 | Frank | B60R 19/24 | 293/155 |
| 2007/0267877 A1 * | 11/2007 | Arns | B60R 19/24 | 293/155 |
| 2012/0292932 A1 * | 11/2012 | Sano | B60R 19/24 | 293/155 |
| 2013/0009411 A1 * | 1/2013 | Harada | B60R 19/18 | 293/132 |
| 2013/0017033 A1 * | 1/2013 | Brown | B60R 19/24 | 411/112 |
| 2014/0091595 A1 * | 4/2014 | Ramoutar | B60R 19/24 | 296/187.09 |
| 2016/0347270 A1 * | 12/2016 | Higashimachi | B60R 19/48 | |
| 2018/0015895 A1 * | 1/2018 | Kaneko | B60R 19/04 | |
| 2019/0061646 A1 * | 2/2019 | Huttenlocher | B60R 19/18 | |
| 2019/0322232 A1 * | 10/2019 | Yagame | B60R 19/24 | |

\* cited by examiner

VEHICLE REAR BUMPER

CROSS-REFERENCE TO RELATED APPLICATION

Priority is claimed on Japanese Patent Application No. 2018-074575, filed on Apr. 9, 2018, the contents of which are incorporated herein by reference.

BACKGROUND

Field of the Invention

The present invention relates to a vehicle rear bumper.

Background

As a vehicle bumper, such a bumper is known which is formed by dividing a bumper face that is arranged on an outer side of a vehicle into a pair of right and left side face blocks that are arranged at an outer position in a vehicle width direction and a middle face block that is arranged at a middle position in the vehicle width direction (for example, refer to Japanese Patent Application, Publication No. H9-104298A).

In the vehicle bumper described in Japanese Patent Application, Publication No. H9-104298A, an outer end part in the vehicle width direction of the middle face block is butted to an end part of the side face block, and the butted parts of the middle face block and the side face block are fixed at a plurality of sections by a fastening member.

SUMMARY

A large load in a bend direction or a torsion direction may act on a rear bumper that is arranged at a rear part of a vehicle by a lower front surface of the rear bumper receiving travel wind and rainwater, a stone, or the like that is thrown up rearward by a front wheel when the vehicle travels at high speed and the like. When the bumper described above of which the bumper face is divided into the pair of right and left side face blocks and the middle face block is applied to the rear bumper, there is a concern that a stress concentration may occur in the vicinity of the fastening fixation part at the outer position in the vehicle width direction of the middle face block when a load such as travel wind from the outside is input.

An aspect of the present invention provides a vehicle rear bumper that is capable of fixing a middle face block to a side face block with high rigidity while preventing a stress concentration in the vicinity of a fastening fixation part of the middle face block.

A vehicle rear bumper according to an aspect of the present invention includes a rear bumper face that is arranged at a vehicle rear part, wherein the rear bumper face includes: a pair of right and left side face blocks that are arranged at an outer position in a vehicle width direction; and a middle face block that is arranged at a middle position in the vehicle width direction, an outer edge part in the vehicle width direction of the middle face block is fastened and fixed attachably and detachably to the right and left side face blocks, the middle face block has a lower flange that extends in a vehicle body frontward direction from a lower end of a block main body part, each of right and left edge parts of the lower flange is fastened and fixed to a lower surface of corresponding one of the right and left side face blocks, and the lower flange is formed such that an extension length to the vehicle body frontward direction and a maximum thickness in a vertical direction are gradually increased from a middle region in the vehicle width direction toward a fastening fixation part with the side face block.

According to the above configuration, the lower flange of the middle face block is fastened and fixed to the lower surface of the corresponding side face block at a part having a long extension length to the vehicle body frontward direction and having a thick maximum thickness in the vertical direction. Further, since in the lower flange of the middle face block, the extension length to the vehicle body frontward direction and the maximum thickness are gradually increased from the middle region in the vehicle width direction toward the fastening fixation part, the strength and the rigidity in the vicinity of the fastening fixation part are maintained to be high, and it is possible to prevent the stress from concentrating on part of the middle face block when a load is externally input. Further, compared to a case where the extension length to the vehicle body frontward direction and the maximum thickness in the vertical direction of the lower flange are increased in the same manner throughout the entire region in the vehicle width direction, it is possible to reduce the weight of the entire middle face block.

An end edge on a vehicle body frontward side of the lower flange may be formed such that a shape is changed in an arc form from a middle region in the vehicle width direction toward the fastening fixation part side.

In this case, since the shape of the front end edge of the lower flange is changed so as to draw an arc, a stress does not easily occur partially when a load is externally input, and it is possible to efficiently reduce the weight of the middle region of the middle face block while improving the strength and the rigidity of the middle face block.

The maximum thickness of the lower flange may be increased at a surface on an opposite side of an overlapped surface with the side face block.

In this case, the maximum thickness of the lower flange is increased at the surface on the opposite side of the overlapped surface with the face block, and therefore, the overlapped surface with the face block of the lower flange is able to be constituted of a substantially flat plane. Therefore, when this configuration is employed, it is possible to stably assemble the lower flange to the lower surface of the side face block with good accuracy.

The lower flange may include: a rear end raised part that expands downward along a side at a vehicle body rearward position; a front edge rib that expands downward along a side at a vehicle body frontward position in an outer region in the vehicle width direction; an insertion hole which is formed in an outer region in the vehicle width direction and through which a fastening member is inserted; an annular rib that expands downward so as to surround a circumferential area of the insertion hole; and a plurality of radial ribs that expand downward so as to extend from the annular rib in a radial direction, and the radial rib that is arranged closer to a middle position in the vehicle width direction than the annular rib of the lower flange may be formed so as to continue to and form a blunt angle with any one of the front edge rib and the rear end raised part.

In this case, it is possible to enhance the strength and the rigidity of the outer region in the vehicle width direction of the lower flange by the rear end raised part, the front edge rib, the annular rib, and the radial rib. Further, the radial rib that is arranged closer to the middle position in the vehicle width direction than the annular rib continues to and forms a blunt angle with any one of the front edge rib and the rear end raised part, and therefore, it is possible to prevent a stress concentration on a connection part between the front edge rib and the radial rib and a connection part between the rear end raised part and the radial rib from occurring when a load acts between the middle region and the outer region in the vehicle width direction of the lower flange. Further, it is possible to thin the thickness of the lower flange other than a part where the rear end raised part, the front edge rib, the annular rib, and the radial rib are arranged, and therefore, it is possible to further reduce the weight of the middle face block. Further, when the middle face block is formed by injection molding, compared to a case where the entire outer region in the vehicle width direction of the lower flange is thick, it is possible to shorten a cooling time of a melt resin. Accordingly, when the above configuration is employed, it is possible to shorten a cycle time of the injection molding and enhance production efficiency.

The lower flange may further include a side edge rib that expands downward along an outer side in the vehicle width direction and that is connected to the front edge rib, two or more of the radial ribs may be arranged at a position that is separated outward in the vehicle width direction across the annular rib from an injection gate trace that is positioned in a middle region in the vehicle width direction of the lower flange, and the two or more of the radial ribs may be connected to the side edge rib.

In this case, at the time of injection molding of the lower flange, the melt resin that is injected via a gate flows toward an outer end part formation section from a middle region formation section of the lower flange of a molding tool.

At this time, the melt resin merges at a rear side (an outer side in the vehicle width direction) of the annular rib and easily becomes a weld part having low rigidity. However, in the case of the above configuration, a pair of the radial ribs are connected to the side edge rib, and thereby, the decrease in the rigidity due to the weld part is supplemented.

An upper edge section of the block main body part of the middle face block may have a step portion that is recessed in a step form to a vehicle body frontward side and that accepts a lower end of a tail gate at a vehicle body rear part that is openable and closable in a flip-up manner, and a fastening hole through which a fastening member for vehicle body fixation is inserted and a recess part that is formed by a circumferential edge part of the fastening hole being recessed to the vehicle body frontward side and that accepts a head part of the fastening member may be formed on the step portion.

In this case, since the recess part is formed on the step portion of the middle face block, and the head part of the fastening member is accepted inside the recess part, when the middle face block is fixed to the vehicle body by the fastening member, even if the tail gate is displaced in a closing direction, it is possible to prevent the tail gate from interfering with the head part of the fastening member.

According to an aspect of the present invention, at a part having a long extension length and having a thick maximum thickness, the lower flange of the middle face block is fastened and fixed to the lower surface of the side face block. Therefore, it is possible to fix the right and left lower end regions of the middle face block to a corresponding side face block with high rigidity.

Further, according to an aspect of the present invention, since the extension length to the vehicle body frontward direction of the lower flange and the maximum thickness are gradually increased from the middle region in the vehicle width direction toward the fastening fixation part, it is possible to maintain the strength and the rigidity in the vicinity of the fastening fixation part to be high, and it is possible to prevent a stress from concentrating on part of the lower flange at the time a load is externally input such as travel wind.

Therefore, when the rear bumper according to an aspect of the present invention is employed, it is possible to fix the middle face block to the side face block with high rigidity while preventing a stress concentration in the vicinity of the fastening fixation part of the middle face block.

DESCRIPTION OF THE EMBODIMENTS

Figure 1:
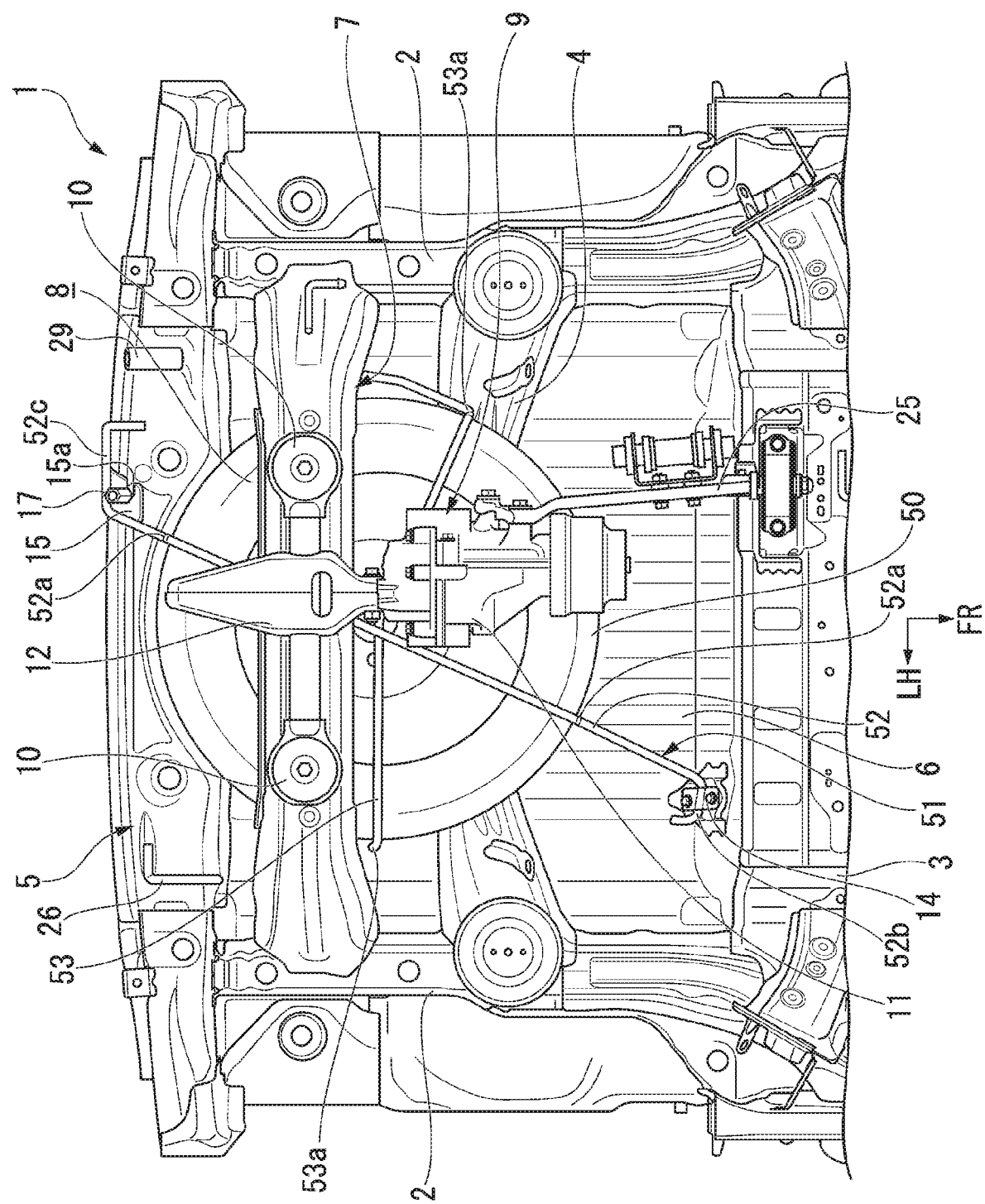
FIG. 1 is a bottom view of a vehicle rear region from which some of the components are removed according to an embodiment of the present invention.

Hereinafter, an embodiment of the present invention will be described with reference to the drawings. In the drawings, an arrow FR that indicates a frontward direction of a vehicle, an arrow UP that indicates an upward direction of the vehicle, and an arrow LH that indicates a leftward direction of the vehicle are shown.

Figure 2:
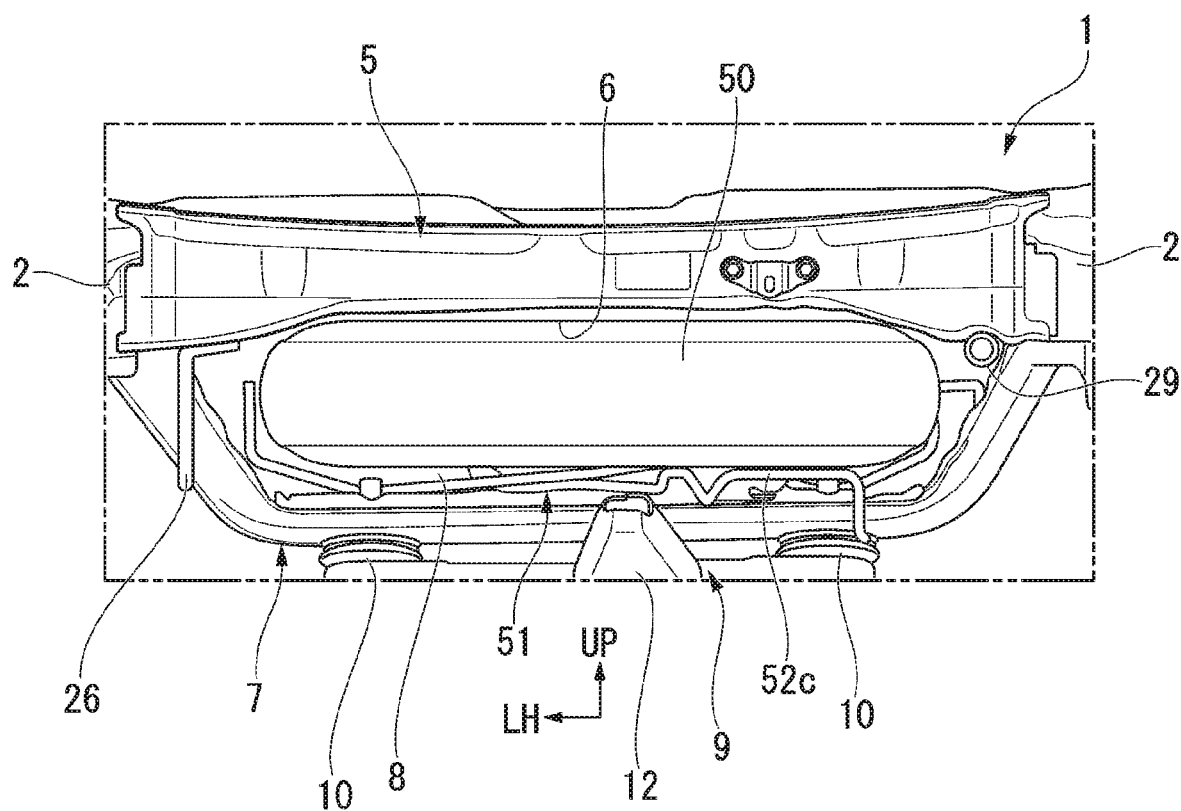
FIG. 2 is a rear view of the vehicle rear region from which some of the components are removed according to the embodiment.
Figure 3:
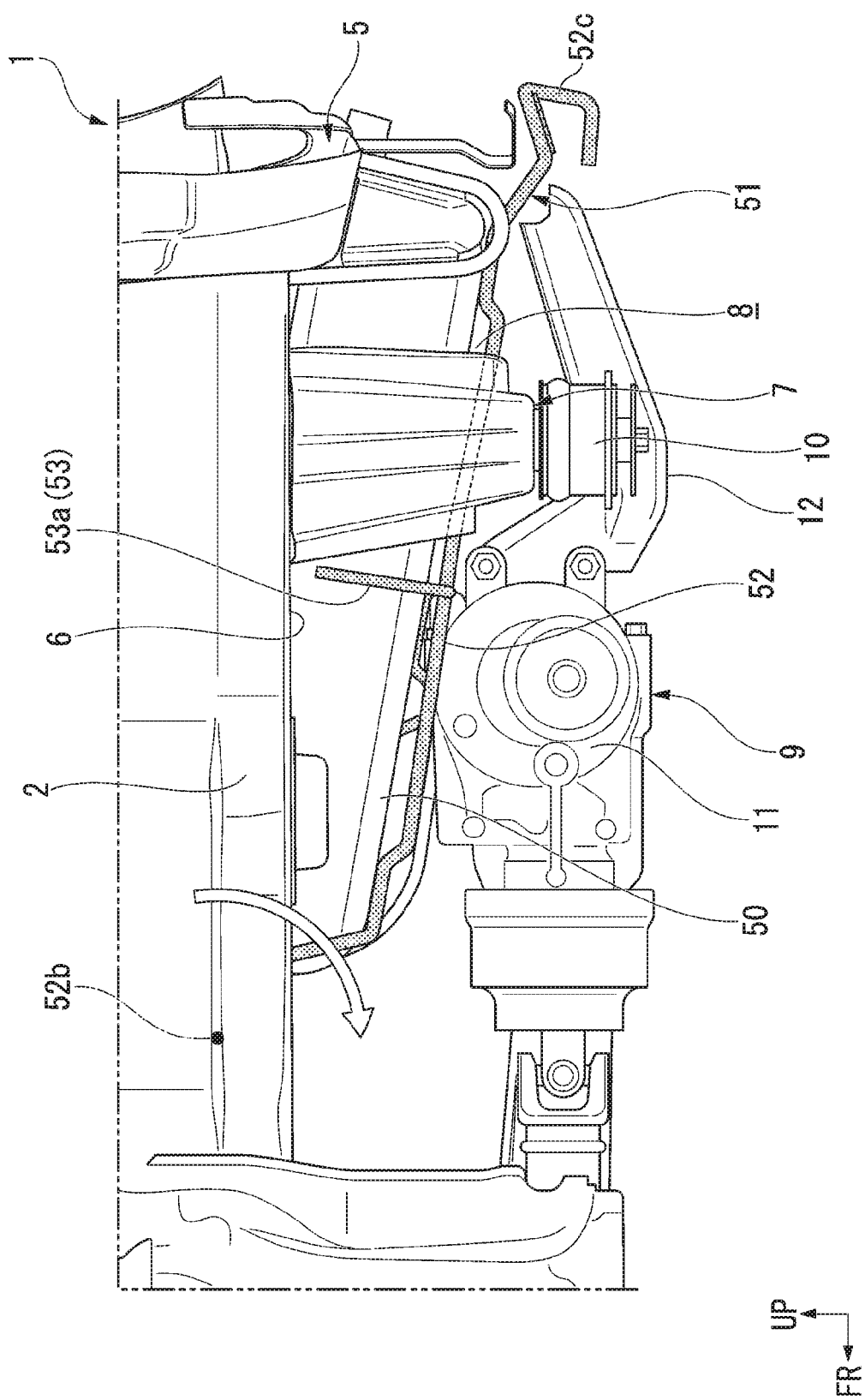
FIG. 3 is a side view of the vehicle rear region from which some of the components are removed according to the embodiment.
Figure 4:
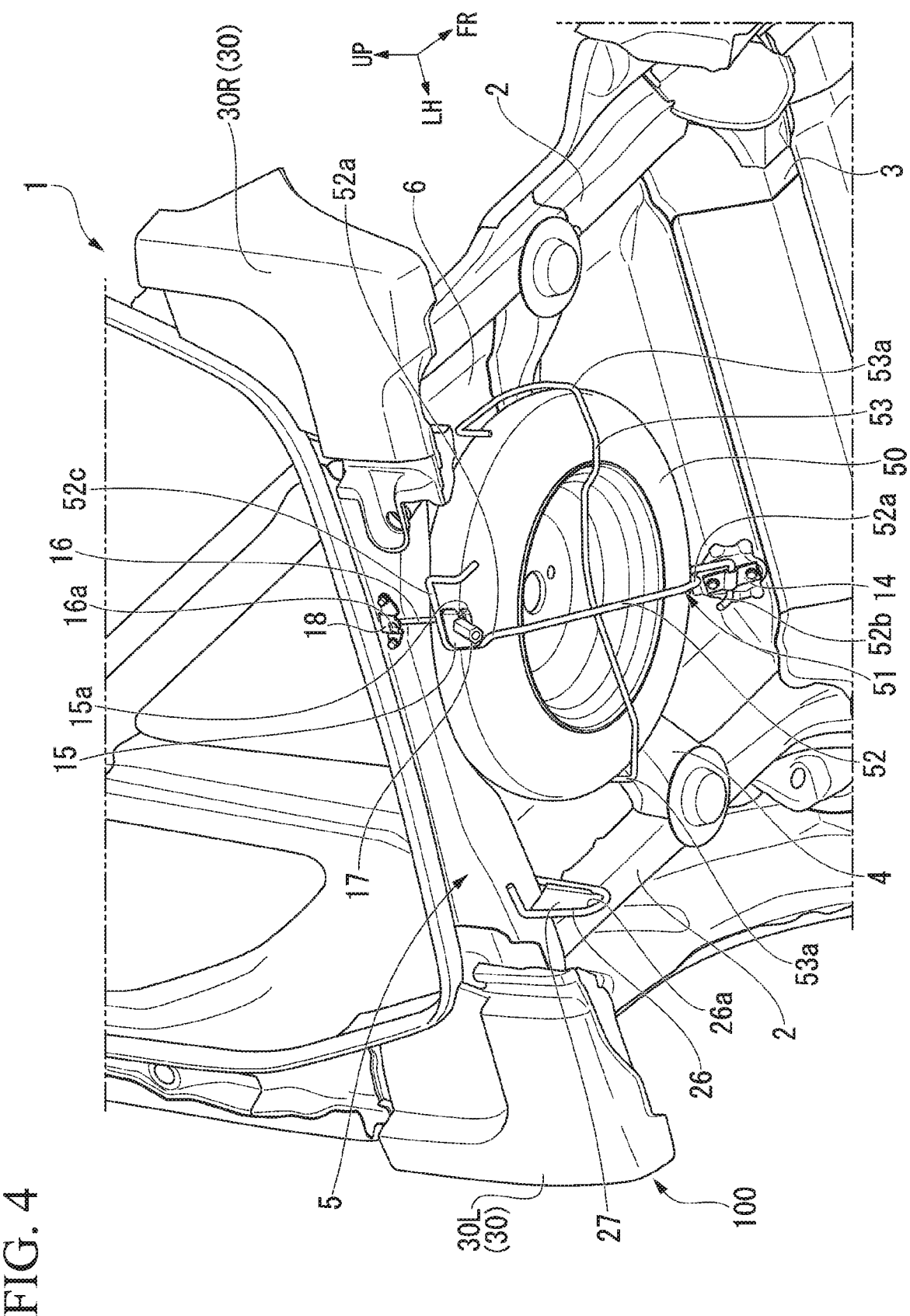
FIG. 4 is a perspective view of the vehicle rear region from which some of the components are removed according to the embodiment.

FIG. 1 is a view of a rear region of a vehicle 1 from which some of the components are removed when seen from a downward direction according to the embodiment. FIG. 2 is a view of the vehicle 1 from which some of the components are removed when seen from a rearward direction. FIG. 3 is a view of the vehicle 1 from which some of the components are removed when seen from a leftward direction. FIG. 4 is a view of a rear region of the vehicle 1 from which some of the components are removed when seen from a rearward rightward, and diagonally downward direction.

The vehicle 1 of the present embodiment is a four-wheel-drive vehicle that transmits a drive force to front wheels and rear wheels from a power source such as an engine. Each of a pair of rear side frames 2 that extend substantially along a vehicle body front-to-rear direction is arranged on each of both right and left sides of the rear part of the vehicle 1. A middle floor cross member 3 that extends along a vehicle width direction is provided on front end parts of the right and left rear side frames 2. A rear floor cross member 4 that extends along the vehicle width direction is provided in a middle region in a front-to-rear direction on the right and left rear side frames 2. A rear end cross member 5 that extends along a vehicle width direction similarly is provided on rear end parts of the right and left rear side frames 2. The right and left rear side frames 2, the middle floor cross member 3, the rear floor cross member 4, and the rear end cross member 5 are joined to a rear floor 6 and support the rear floor 6.

A differential mounted cross member 7 that extends along the vehicle width direction is provided on the right and left rear side frames 2 between arrangement positions of the rear floor cross member 4 and the rear end cross member 5. As shown in FIG. 2, the differential mounted cross member 7 is formed in a substantially U shape having a middle region recessed downward in a vehicle rear view. Accordingly, a space part is provided between the rear floor 6 and the middle region in the vehicle width direction of the differential mounted cross member 7. The space part constitutes a tire accommodation part 8. A spare tire 50 is accommodated via a tire carrier 51 in the tire accommodation part 8. In FIG. 4, the differential mounted cross member 7 and a differential device 9 described below are not shown for ease of understanding.

A rear wheel differential device 9 that distributes and transmits a power of a drive source such as the engine to right and left rear wheels is arranged below a middle region of the rear floor 6.

The differential device 9 is fixed to a lower surface of the differential mounted cross member 7 via a pair of mount parts 10 having a buffer function. The differential device 9 includes a main body block 11 that stores a differential mechanism inside the main body block 11 and a rear connection block 12 that is provided to extend on a rear part of the main body block 11. A drive transmission propeller shaft (not shown) is connected to a front middle surface of the main body block 11. A rear wheel axle (not shown) is connected to right and left side parts of the main body block 11.

As shown in FIG. 4, the tire carrier 51 includes a main rod 52 that extends substantially along a diameter direction of the spare tire 50 below the spare tire 50 and a sub rod 53 that is joined to a substantially middle in an extension direction of the main rod 52 and that extends in a direction which crosses with the extension direction of the main rod 52. The main rod 52 and the sub rod 53 are formed of a metal material and are fixed by welding to each other at the crossing part. Outer circumference support parts 52a, 53a that are bent upward and support an outer circumference part of the spare tire 50 are formed on end edges on both sides in the extension direction of the main rod 52 and the sub rod 53.

A pivot part 52b that is bent in a substantially U shape is integrally formed on an end part in the extension direction of the outer circumference support part 52a on one end side of the main rod 52. The pivot part 52b is supported rotatably by a lower surface of a front region of the rear floor 6 via a support bracket 14. The tire carrier 51 is supported by the lower surface of the rear floor 6 such that the tire carrier 51 is tiltable around the pivot part 52b of the main rod 52.

A latch part 52c that is bent in a substantially U shape is integrally formed on an end part in the extension direction of the outer circumference support part 52a on another end side of the main rod 52. A latch plate 15 having an insertion slit 15a and made of a metal is integrally attached to the latch part 52c. The latch part 52c is capable of being latched to the rear end cross member 5 at a vehicle body rear part via a fixation rod 16 as a separate body.

A latch hook 16a is integrally formed on an upper end part of the fixation rod 16. A latch bolt 17 is screwed to a lower end part of the fixation rod 16. The latch hook 16a of the fixation rod 16 is capable of being supported and suspended by a fixation bracket 18 that is attached to a rear surface of the rear end cross member 5. The latch part 52c of the main rod 52 is latched to the vehicle body rear part by the latch bolt 17 being screwed in a state where the fixation rod 16 is inserted in the insertion slit 15a of the latch plate 15. Specifically, the spare tire 50 is arranged sideways on an upper part of the tire carrier 51, and in that state, the latch bolt 17 is screwed by a tool. Thereby, the latch part 52c of the main rod 52 is held by the rear end cross member 5 via the fixation rod 16 in a state where the spare tire 50 is pushed to the lower surface side of the rear floor 6 in the middle region of the tire carrier 51.

Figure 5:
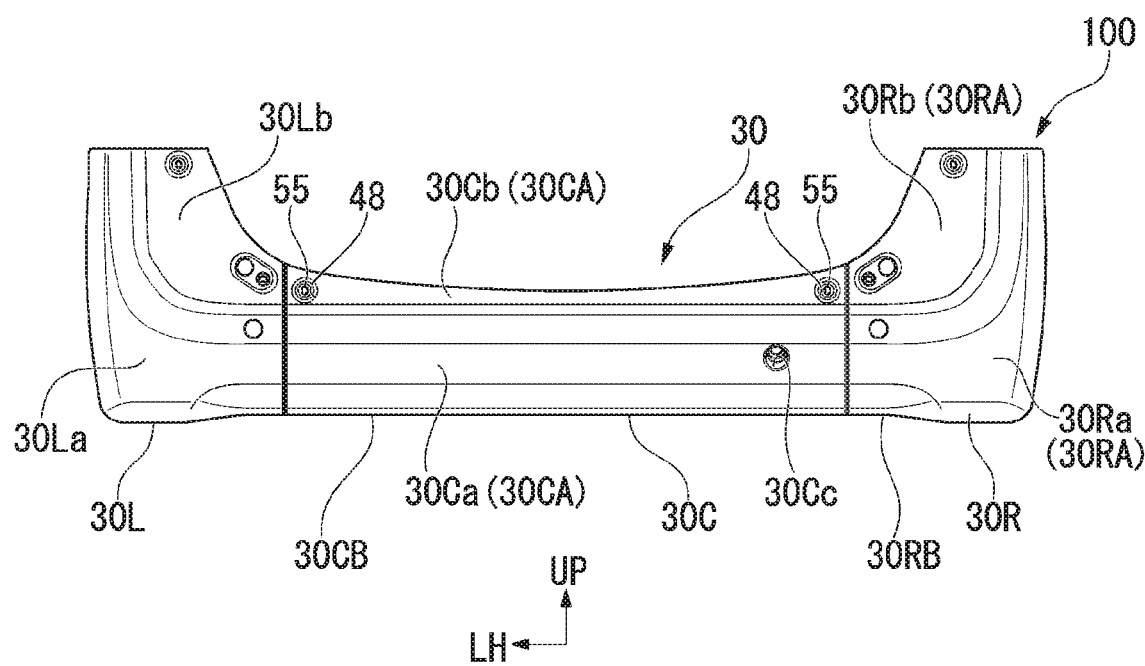
FIG. 5 is a rear view of a rear bumper face according to the embodiment.
Figure 6:
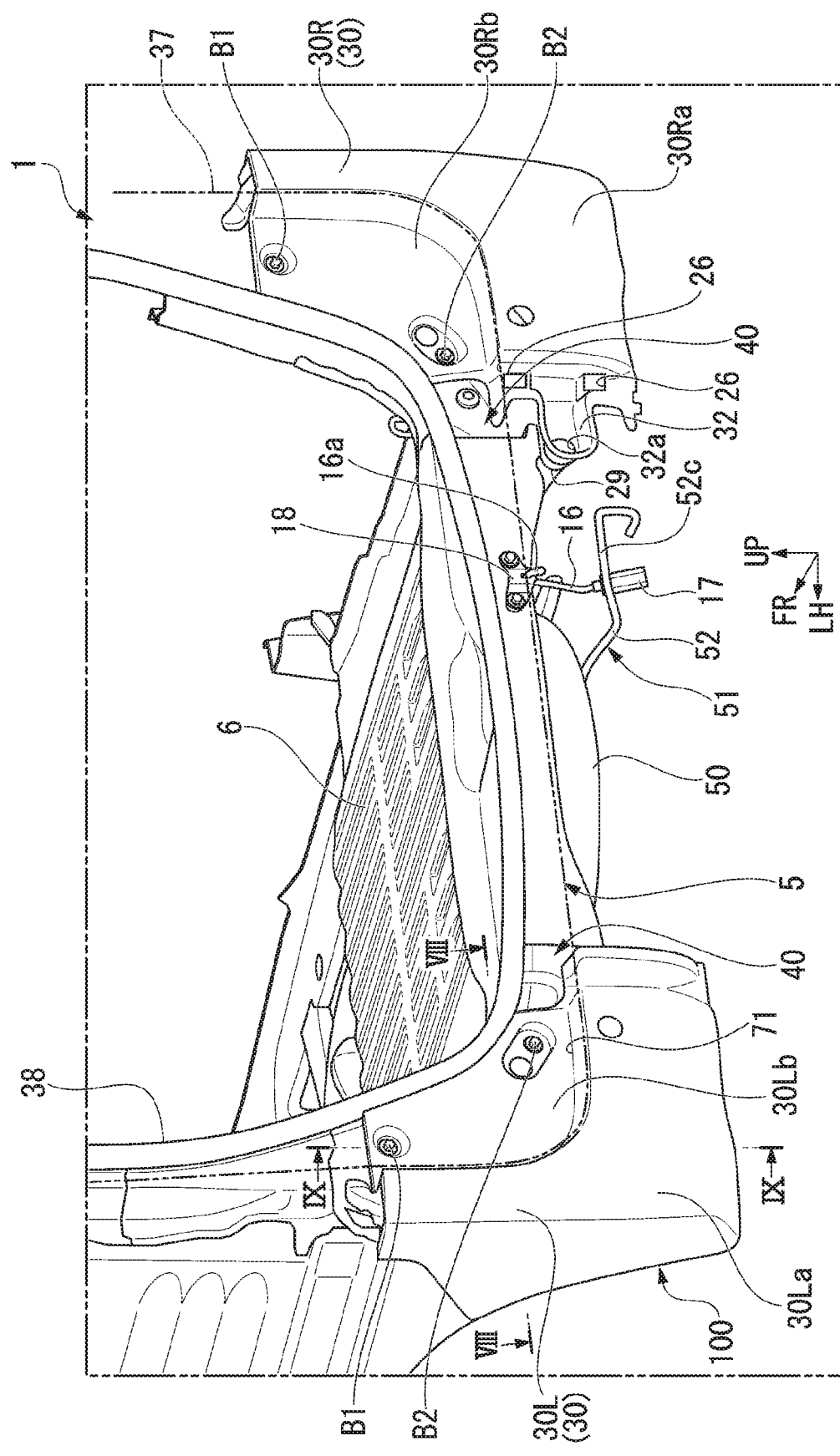
FIG. 6 is a perspective view of the vehicle rear region from which some of the components are removed according to the embodiment.
Figure 7:
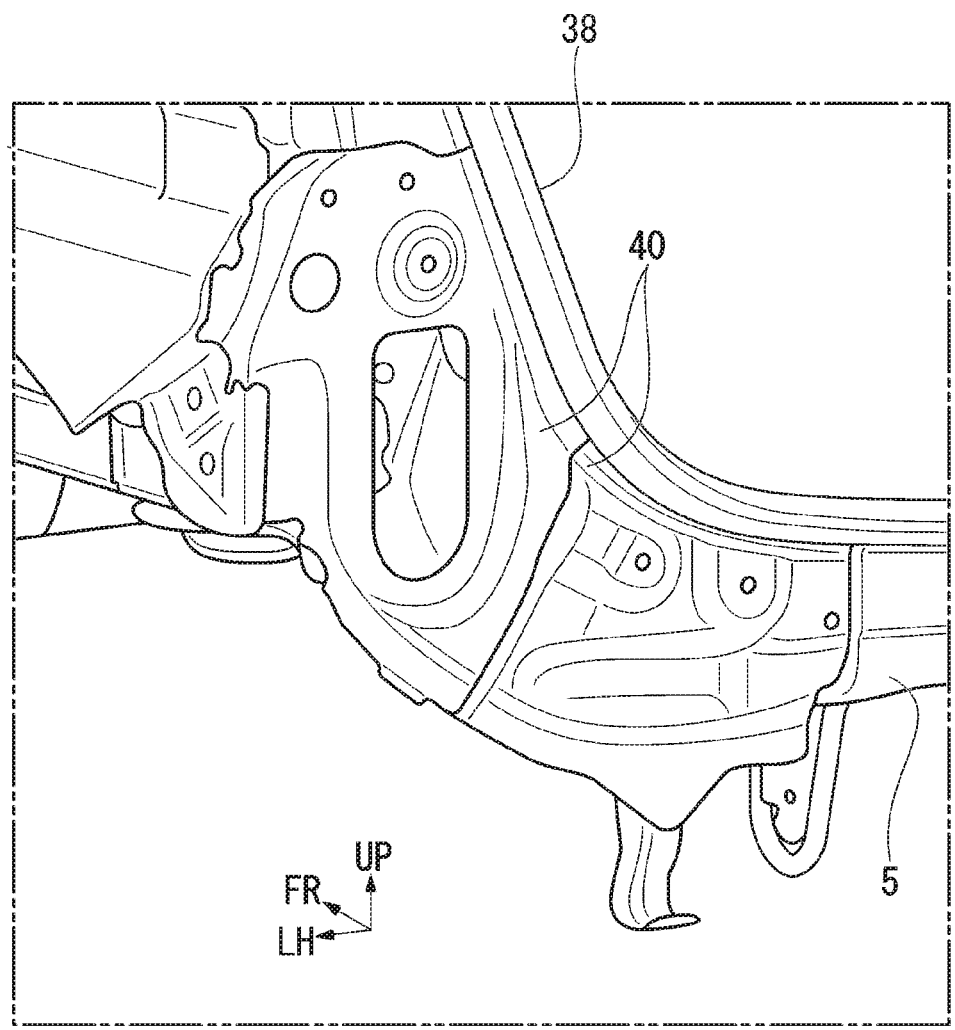
FIG. 7 is a perspective view of a vehicle rear part from which the rear bumper face is removed according to the embodiment.
Figure 8:
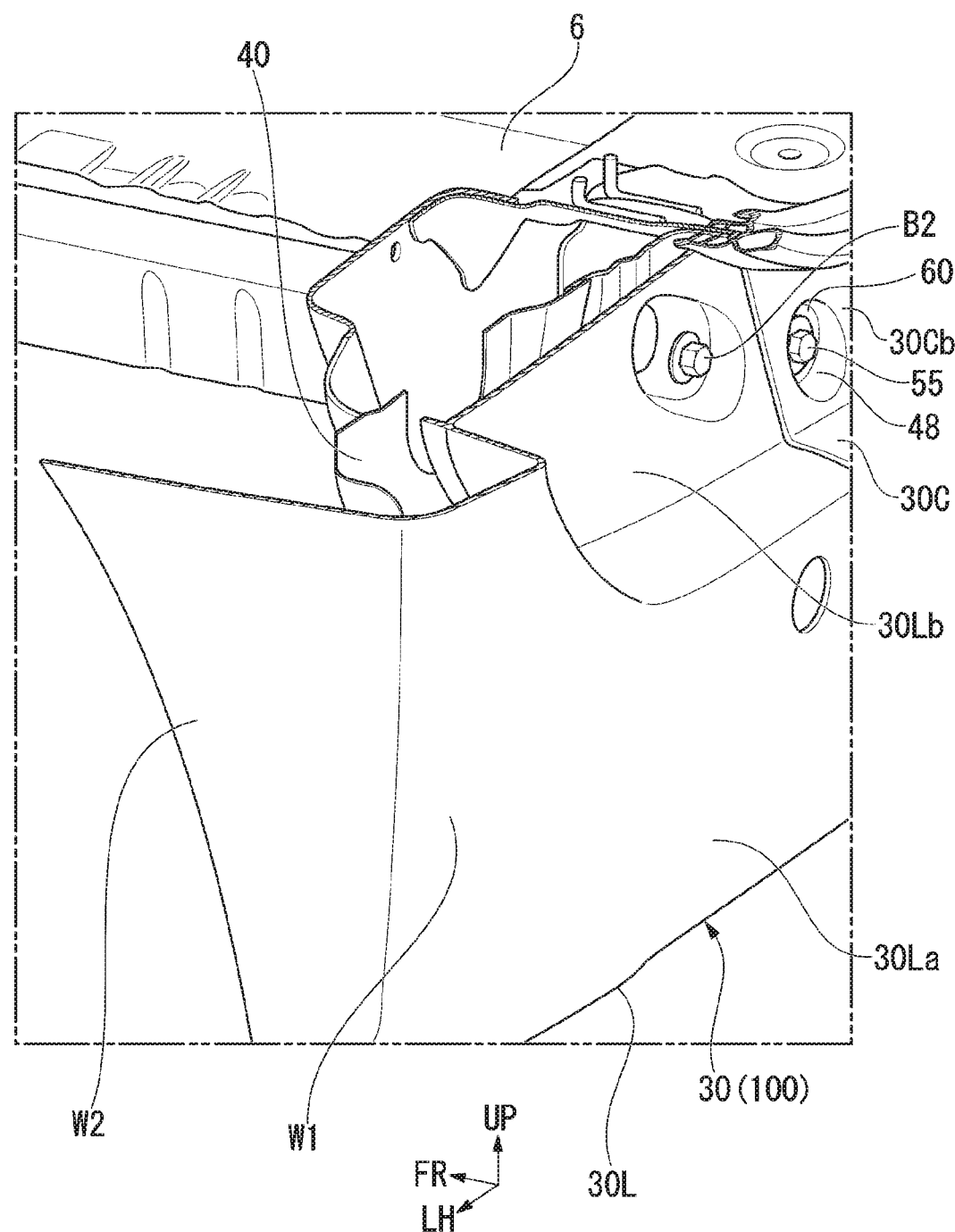
FIG. 8 is a partial cross-sectional perspective view sectioned at a VIII-VIII cross-section part of FIG. 6 of a vehicle according to the embodiment.
Figure 9:
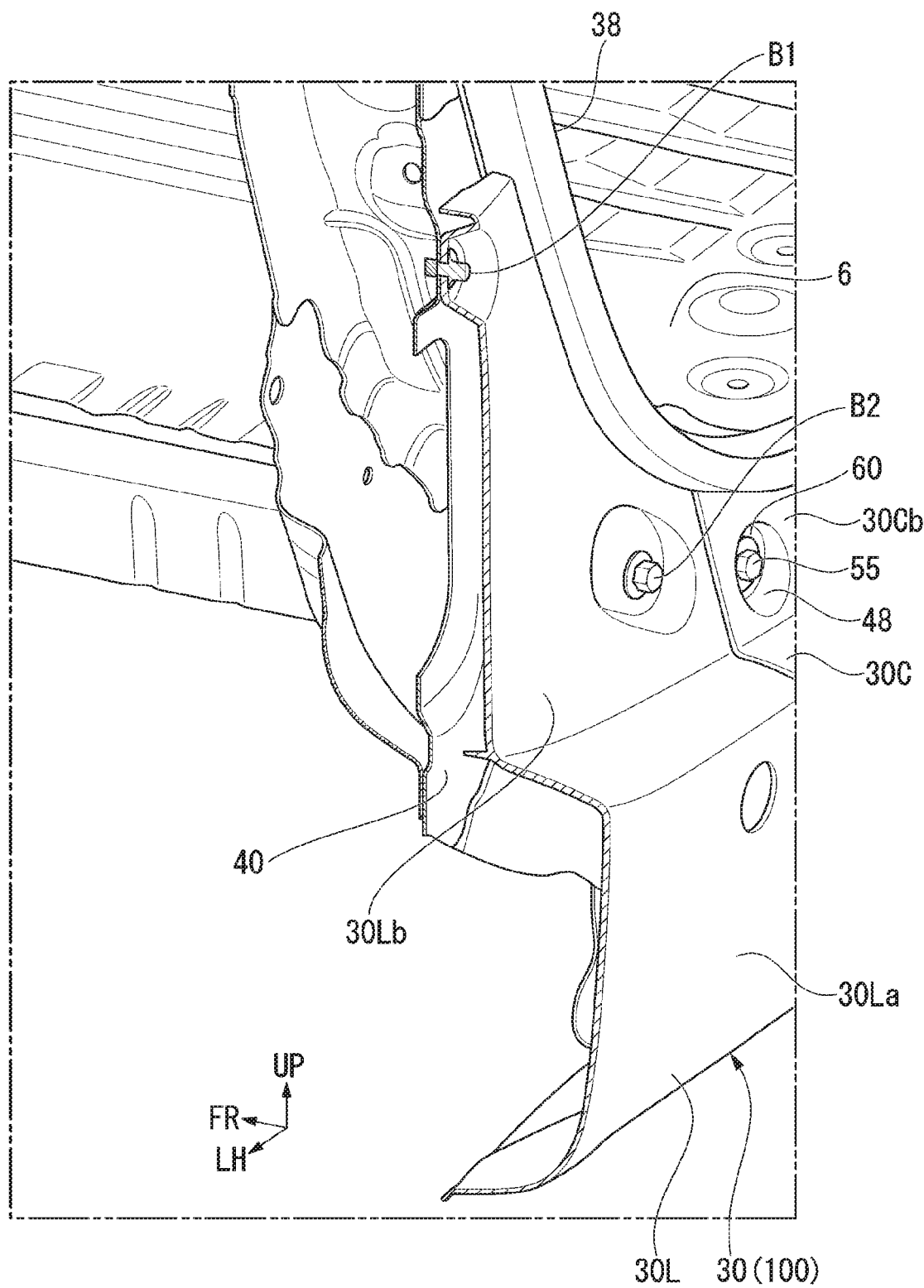
FIG. 9 is a partial cross-sectional perspective view sectioned at a IX-IX cross-section part of FIG. 6 of the vehicle according to the embodiment.

FIG. 5 is a rear view of a rear bumper face 30 that is attached to the vehicle body rear part. FIG. 6 is a view of the rear part of the vehicle 1 from which a middle face block 30C of the rear bumper face 30 is removed when seen from a leftward and diagonally upward direction. FIG. 7 is a view of a left rear part of the vehicle body from which a side face block 30L is removed when seen from a leftward and diagonally upward direction. FIG. 8 is a partial cross-sectional perspective view showing a VIII-VIII cross-section part of FIG. 6. FIG. 9 is a partial cross-sectional perspective view showing a IX-IX cross-section part of FIG. 6.

The rear bumper face 30 is a member that constitutes a main part of a rear bumper 100. The rear bumper face 30 includes a pair of side face blocks 30L, 30R each of which is arranged at each of left and right positions in the vehicle width direction and the middle face block 30C that is arranged between the pair of side face blocks 30L, 30R. The middle face block 30C is attached attachably and detachably to the left and right side face blocks 30L, 30R and left and right rear panels 40 at the vehicle body rear part. Main parts of the side face blocks 30L, 30R and the middle face block 30C are formed of a plastic material. The left and right side face blocks 30L, 30R are formed in a substantially L shape in a rear view and are arranged at a corner part on a lower side of the vehicle body rear part. On the other hand, the middle face block 30C is formed in a linear shape that extends in a horizontal direction in a rear view. The width in the vehicle width direction of the middle face block 30C is set to be wider than the diameter of the spare tire 50. At the time of an attaching/detaching work of the spare tire 50, by removing the middle face block 30C, it is possible to easily perform the attaching/detaching work through an opening between the left and right side face blocks 30L, 30R.

The middle face block 30C is formed such that a design surface 30Ca of the middle face block 30C is flush with design surfaces 30La, 30Ra of the left and right side face blocks 30L, 30R. Right and left edge parts of the middle face block 30C are attached to the rear panel 40 at the vehicle body rear part by bolt fastening and clip fixation.

As shown in FIG. 5, a step part 30Cb that is recessed in a step shape in a vehicle body frontward direction with respect to the design surface 30Ca which is directed to a vehicle body rearward side is formed on an upper edge part on the rear side of the middle face block 30C. Similarly, step parts 30Lb, 30Rb that are recessed in a step shape in the vehicle body frontward direction with respect to the design surfaces 30La, 30Ra which are directed to the vehicle body rearward side are formed in an inner region of the substantially L shape in a rear view of the left and right side face blocks 30L, 30R. The step part 30Cb of the middle face block 30C and the step parts 30Lb, 30Rb of the left and right side face blocks 30L, 30R are formed so as to continue to each other without a step difference. A lower edge part and left and right lower corner parts of a tail gate 37 are accepted by the step parts 30Cb, 30Lb, 30Rb when the tail gate 37 (refer to FIG. 6) as an opening/closing member at the vehicle body rear part is closed. The tail gate 37 is attached rotatably in a flip-up manner to an upper part of an opening (a tail gate opening 38) at the vehicle body rear part.

As shown in FIG. 6, the rear panel 40 as a vehicle body rear panel made of a metal is arranged at an outer position in the vehicle width direction of the rear end cross member 5 at a vehicle body rear lower part. The rear panel 40 shown in FIG. 6 is formed in a substantially L shape in a rear view so as to surround the tail gate opening 38 at the vehicle body rear part.

Figure 10:
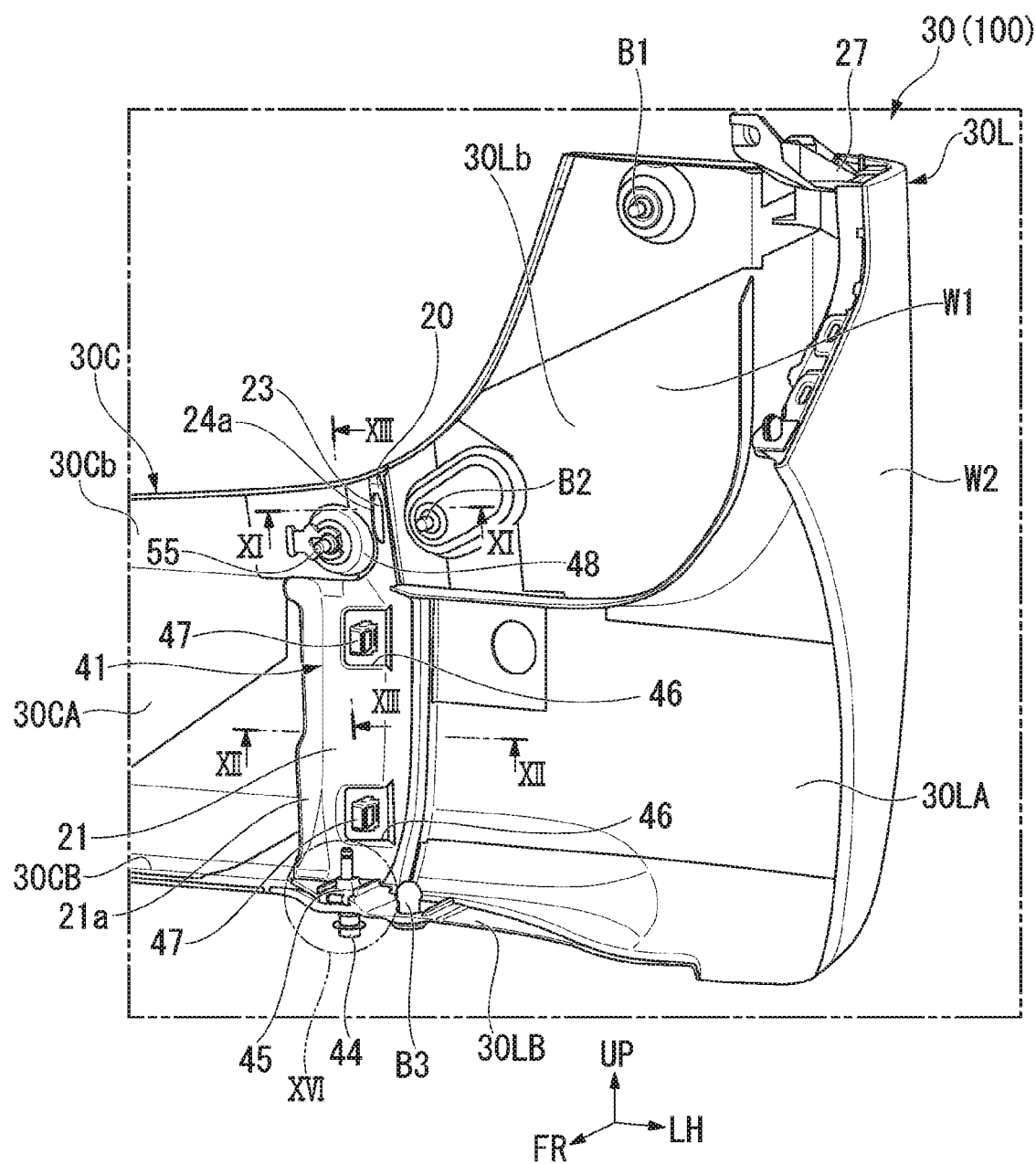
FIG. 10 is a perspective view of the rear bumper face seen from a back surface side according to the embodiment.
Figure 11:
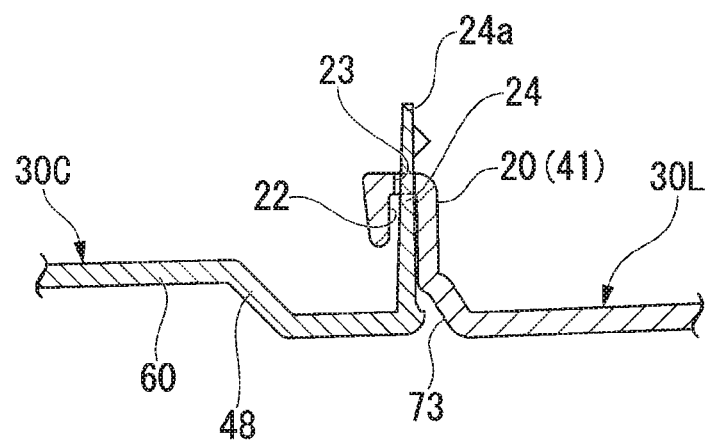
FIG. 11 is a cross-sectional view of the rear bumper face along a XI-XI line of FIG. 10 according to the embodiment.
Figure 12:
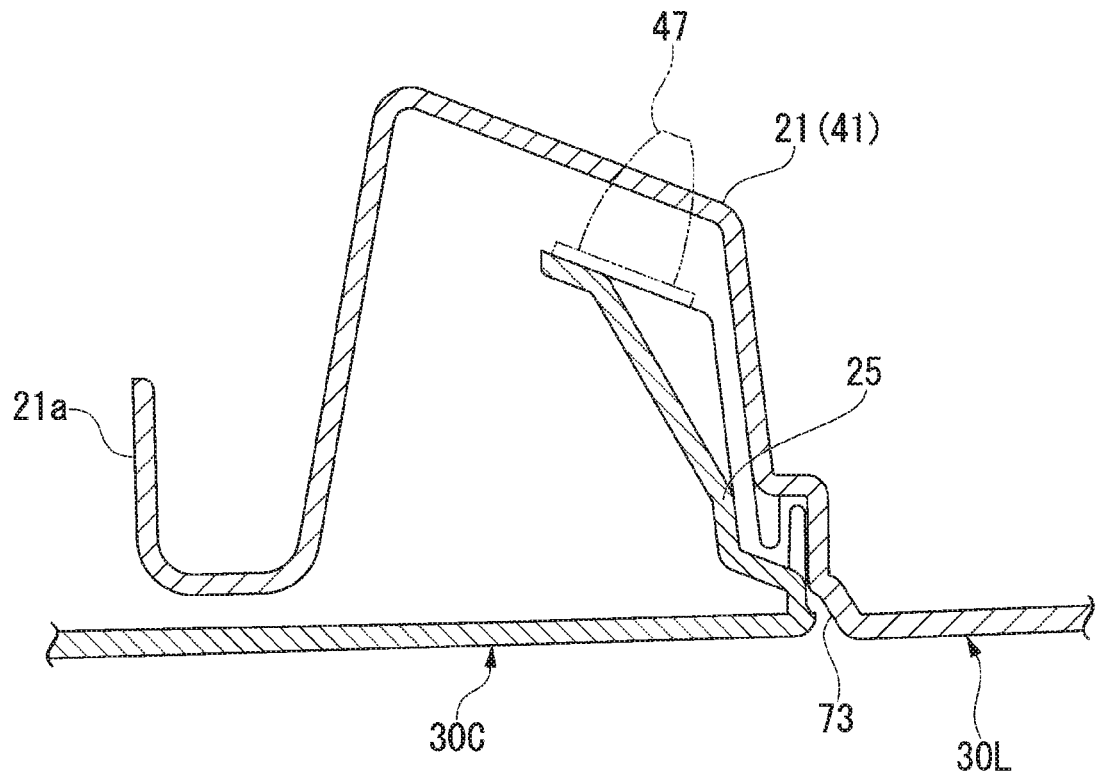
FIG. 12 is a cross-sectional view of the rear bumper face along a XII-XII line of FIG. 10 according to the embodiment.
Figure 13:
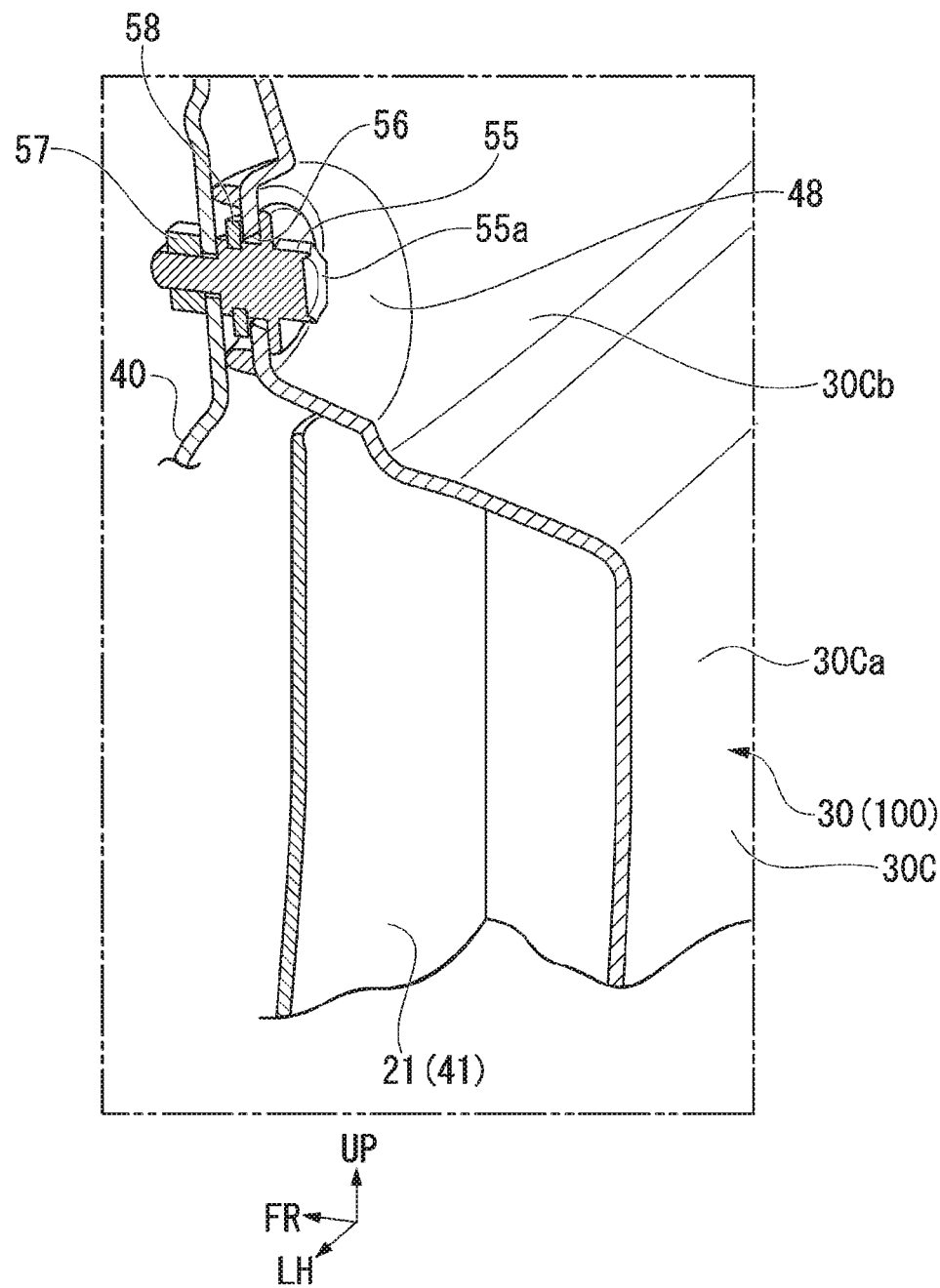
FIG. 13 is a partial cross-sectional perspective view sectioned at a XIII-XIII cross-section part of FIG. 10 of an attachment part of the rear bumper face according to the embodiment.

FIG. 10 is a view of the left side face block 30L and the middle face block 30C seen from a diagonally upward direction on a back surface side (a vehicle body frontward side in a vehicle body assembly state). FIG. 11 is a cross-sectional view along a XI-XI line of FIG. 10. FIG. 12 is a cross-sectional view along a XII-XII line of FIG. 10. FIG. 13 is a partial cross-sectional perspective view of the vehicle body rear part sectioned at a XIII-XIII cross-section part of FIG. 10.

As shown in FIG. 10, a boundary engagement part 41 of which the cross-section extends continuously in the vertical direction and which expands to the back surface side (vehicle body frontward side) of the side face block 30L is provided on an inner end edge in the vehicle width direction of the left side face block 30L. The boundary engagement part 41 is capable of being engaged with an outer end edge in the vehicle width direction of the middle face block 30C.

The left side face block 30L and the right side face block 30R have a substantially similar structure and are similarly fixable to a side edge part of the middle face block 30C. Therefore, in the following, only the left side face block 30L is described in detail, and the right side face block 30R is not described in detail.

As shown in FIG. 11, an upper region (a region that corresponds to the step part 30Lb of the side face block 30L) of the boundary engagement part 41 is constituted of a bend wall 20 which extends toward the back surface side of the side face block 30L and of which the front end part is then bent in a substantially U shape in a surface direction. As shown in FIG. 12, a lower region (a region that corresponds to the design surface 30La below the step part 30Lb of the side face block 30L) of the boundary engagement part 41 is constituted of a recess shape wall 21 that expands in the back surface direction of the side face block 30L and that has a recess shape in a cross-section.

As shown in FIG. 11, an engagement groove 22 that opens to the vehicle body rearward side is formed on the bend wall 20. An engagement hole 23 having an elongated hole shape that extends along the vertical direction is formed on a top part of the bend wall 20. On the other hand, an engagement piece 24 that is engaged with the engagement groove 22 of the bend wall 20 of the side face block 30L is provided to protrude in an upper region of the outer end edge in the vehicle width direction of the middle face block 30C. A latch claw 24a that is inserted in the engagement hole 23 on the side face block 30L side is formed on part of the engagement piece 24.

The engagement piece 24 is engaged inside the engagement groove 22, the latch claw 24a of the engagement piece 24 is fitted into the engagement hole 23 of the bend wall 20, and thereby, the upper region of the side face block 30L and the upper region of the middle face block 30C are engageable with each other.

As shown in FIG. 12, a turned-back flange 21a having a substantially U shape in a cross-section is provided to extend on an extension end of the cross-section having a U shape of the recess shape wall 21. The turned-back flange 21a is formed continuously in the vertical direction on the extension end of the recess shape wall 21. The rigidity of the recess shape wall 21 is improved by the turned-back flange 21a. As shown in FIG. 10, a clip insertion hole 46 that penetrates between front and back surfaces is formed at positions that are separated in the vertical direction of the bottom part of the recess shape wall 21.

As shown in FIG. 12, a bend piece 25 that is inserted to the inside of the recess shape wall 21 of the side face block 30L from an outer surface side (vehicle body rearward side) of the side face block 30L is provided to extend on an outer end part in the vehicle width direction in a lower region of the middle face block 30C. The bend piece 25 is formed continuously in the vertical direction along the outer end part in the vehicle width direction of the middle face block 30C. A pair of fixation clips 47 for latching the middle face block 30C to the rear panel 40 are attached to part of the bend piece 25. A front end part of each of the fixation clips 47 protrudes toward the vehicle body frontward side via upper and lower clip insertion holes 46 on the side face block 30L side. Each of the fixation clips 47 is fitted to a latch hole 26 (refer to FIG. 6) that is formed on the rear panel 40 of the vehicle body.

As shown in FIG. 10, the side face block 30L includes a rear wall W1 that has a substantially L shape in a vehicle body rear view and that is opposed to a rear surface of the vehicle body and a side wall W2 that is opposed to a rear side surface of the vehicle body. A bracket 27 that also reinforces the side wall W2 and that is made of a metal is attached to an upper part of the side wall W2. The rear wall W1 of the side face block 30L is fastened and fixed to the rear panel 40 by a plurality of (for example, three) bolts B1, B2, B3 (fastening member) that are separated in the vertical direction. The side wall W2 of the side face block 30L is fixed to a vehicle body side part by a bolt and a clip.

As shown in FIG. 10, the side face block 30L includes: a block main body part 30LA including the design surface 30La and the step part 30Lb at an upper part of the design surface 30La; and a lower flange 30LB that extends to the vehicle body frontward side from a lower end of the block main body part 30LA. Similarly to the side face block 30L, the middle face block 30C also includes: a block main body part 30CA including the design surface 30Ca and the step part 30Cb at an upper part of the design surface 30Ca; and a lower flange 30CB that extends to the vehicle body frontward side from a lower end of the block main body part 30CA.

The boundary engagement part 41 of the side face block 30L described above is formed on an inner edge part in the vehicle width direction of the block main body part 30LA of the side face block 30L. The bend piece 25 and the engagement piece 24 of the middle face block 30C are formed on an outer edge part in the vehicle width direction of the block main body part 30CA of the middle face block 30C.

In the middle face block 30C, a side edge part of the block main body part 30CA is overlapped on a side edge part of the block main body part 30LA of the side face block 30L from the vehicle body rearward side, and a side edge part of the lower flange 30CB is overlapped on the lower flange 30LB of the side face block 30L from the vehicle body lower side. In this state, the lower flange 30CB of the middle face block 30C is fixed attachably and detachably to the lower flange 30LB of the side face block 30L by a bolt 44 as a fastening member. A fastening configuration between the lower flange 30CB of the middle face block 30C and the lower flange 30LB of the side face block 30L is described in detail below.

Figure 14:
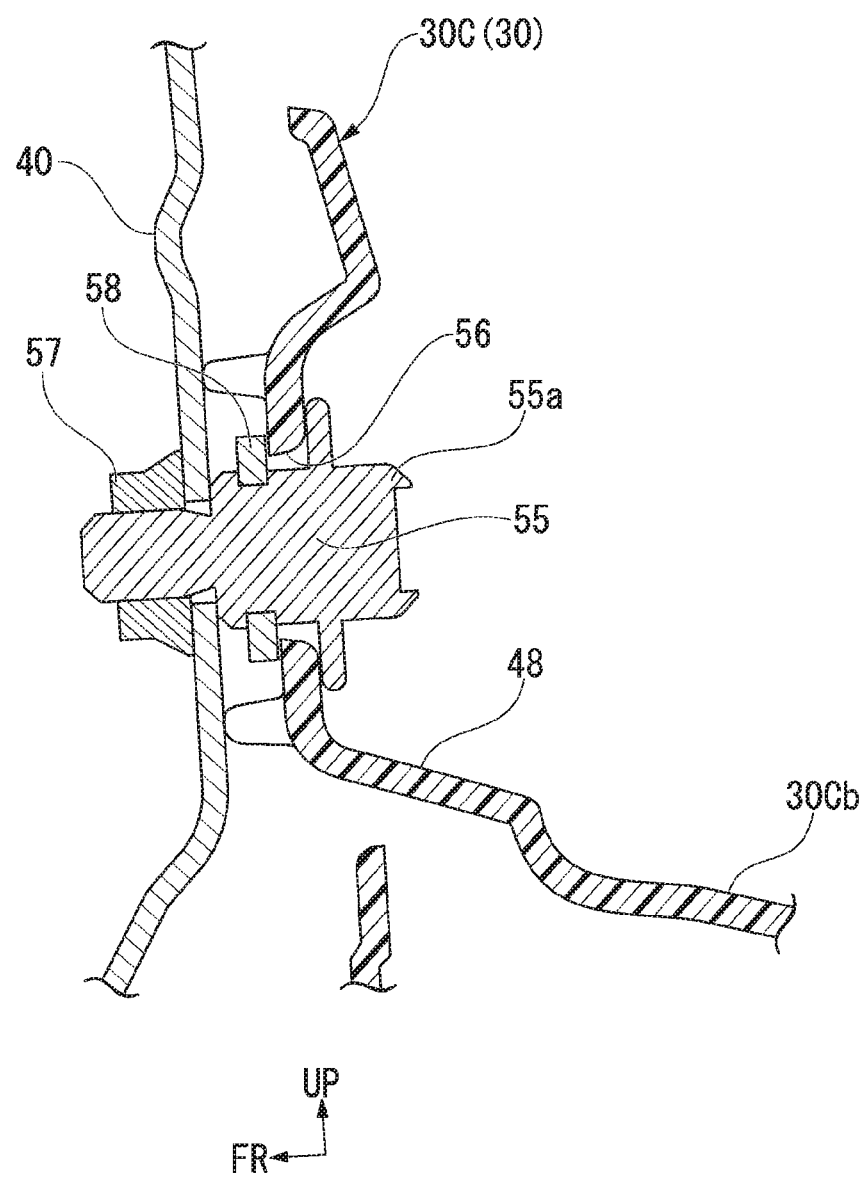
FIG. 14 is a cross-sectional view of the attachment part of the rear bumper face along the XIII-XIII line of FIG. 10 according to the embodiment.
Figure 15:
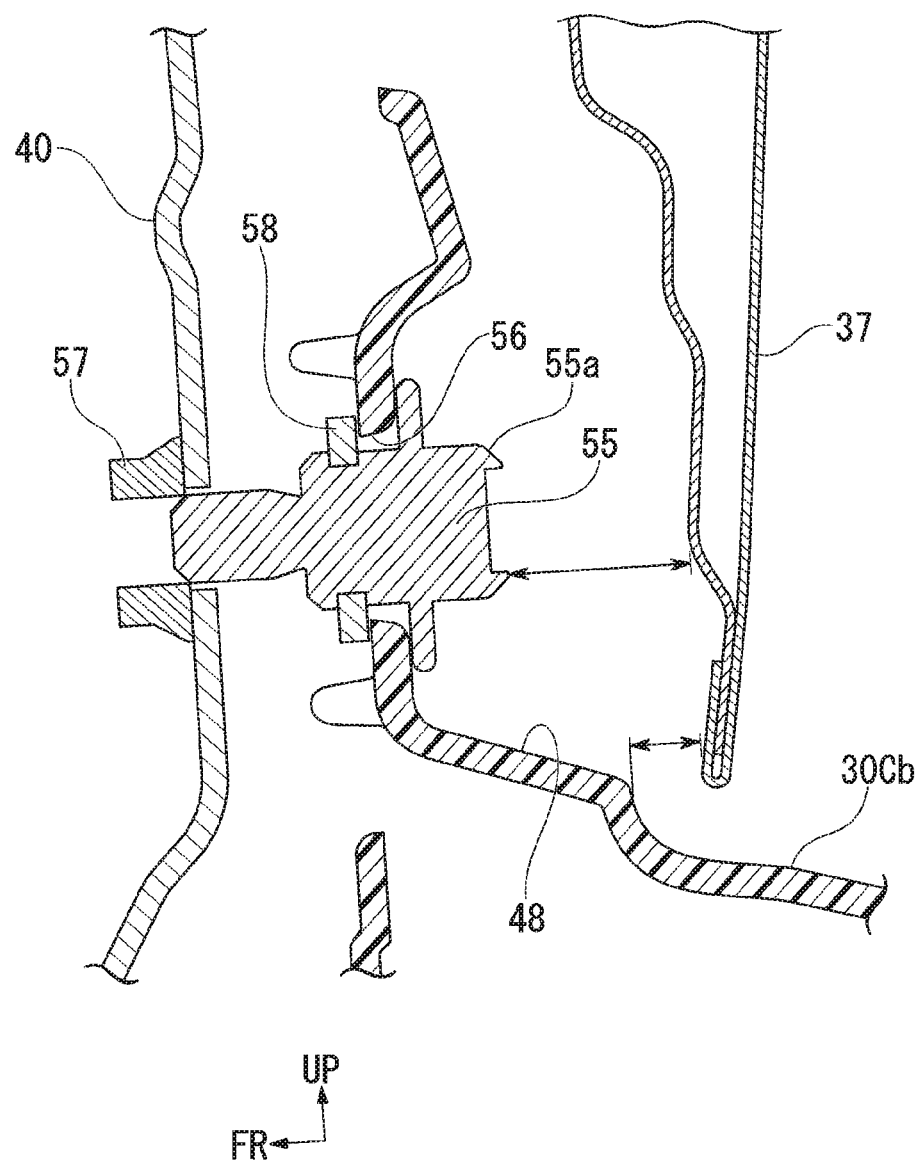
FIG. 15 is a cross-sectional view of the rear bumper face along the XIII-XIII line of FIG. 10 at the time of vehicle body assembly according to the embodiment.

FIG. 14 is a cross-sectional view of an attachment part with respect to the vehicle body rear part of the middle face block 30C along the XIII-XIII line of FIG. 10. FIG. 15 is a cross-sectional view similar to FIG. 14 showing a state when the middle face block 30C is attached to the vehicle body rear part.

As shown in FIG. 13 and FIG. 14, a fastening hole 56 through which a bolt 55 (fastening member) for vehicle body fixation is inserted is formed on an outer edge part in the vehicle width direction of the step part 30Cb of the middle face block 30C. A circumferential edge part of the fastening hole 56 in the step part 30Cb is recessed in a substantially circular shape toward the vehicle body frontward side and forms a recess part 48 that accepts a head part 55a of the bolt 55. The bolt 55 that is inserted in the fastening hole 56 of the step part 30Cb is fastened and fixed to a weld nut 57 that is provided on the rear panel 40. Since the upper end side of the block main body part 30CA of the middle face block 30C is engaged with the side edge part of the side face block 30L from the vehicle body rearward side as described above, the upper portion of the side edge part is fastened to the rear panel 40 by the bolt 55, and thereby, the engagement state with respect to the side edge part of the side face block 30L is solidly maintained.

A clip member 58 in FIG. 13 and FIG. 14 latches a shaft part of the bolt 55 that is inserted in the fastening hole 56 from the back surface side (vehicle body frontward side) of the step part 30Cb.

As shown in FIG. 15, the middle face block 30C is preliminarily assembled to the vehicle body rear part in a state where the shaft part of the bolt 55 is inserted in the fastening hole 56 of the step part 30Cb and where the shaft part is latched to the edge part of the fastening hole 56 by the clip member 58, and in that state, the bolt 55 is screwed to the weld nut 57 on the rear panel 40 side. In the state where the middle face block 30C is preliminarily assembled to the vehicle body rear part, the head part 55a of the bolt 55 is positioned inside the recess part 48 of the step part 30Cb of the middle face block 30C. Therefore, at this time, even if the tail gate 37 may be closed, an end part of the tail gate 37 first hits against the circumferential edge portion of the recess part 48, and the head part 55a of the bolt 55 does not interfere directly with a back surface of the tail gate 37.

Figure 16:
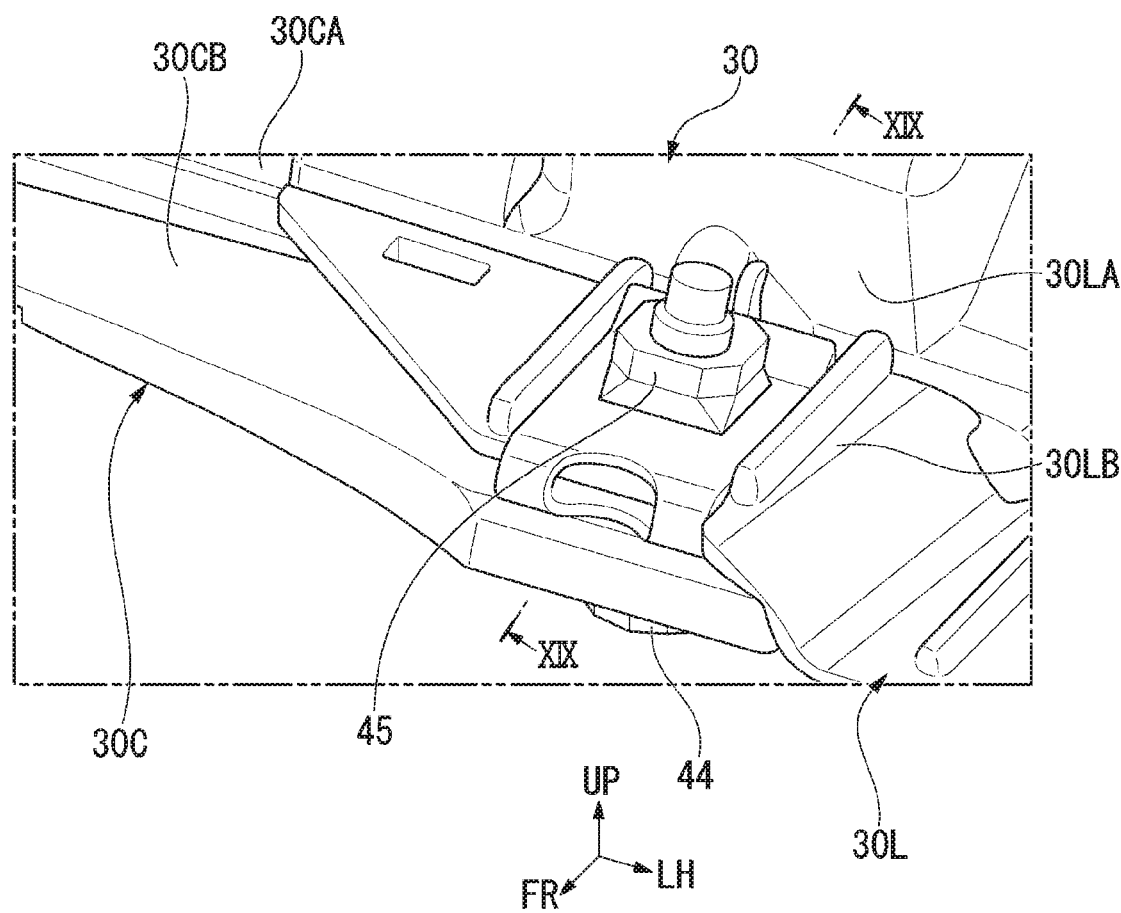
FIG. 16 is an enlarged view of a XVI part of FIG. 10 of the rear bumper face according to the embodiment.
Figure 17:
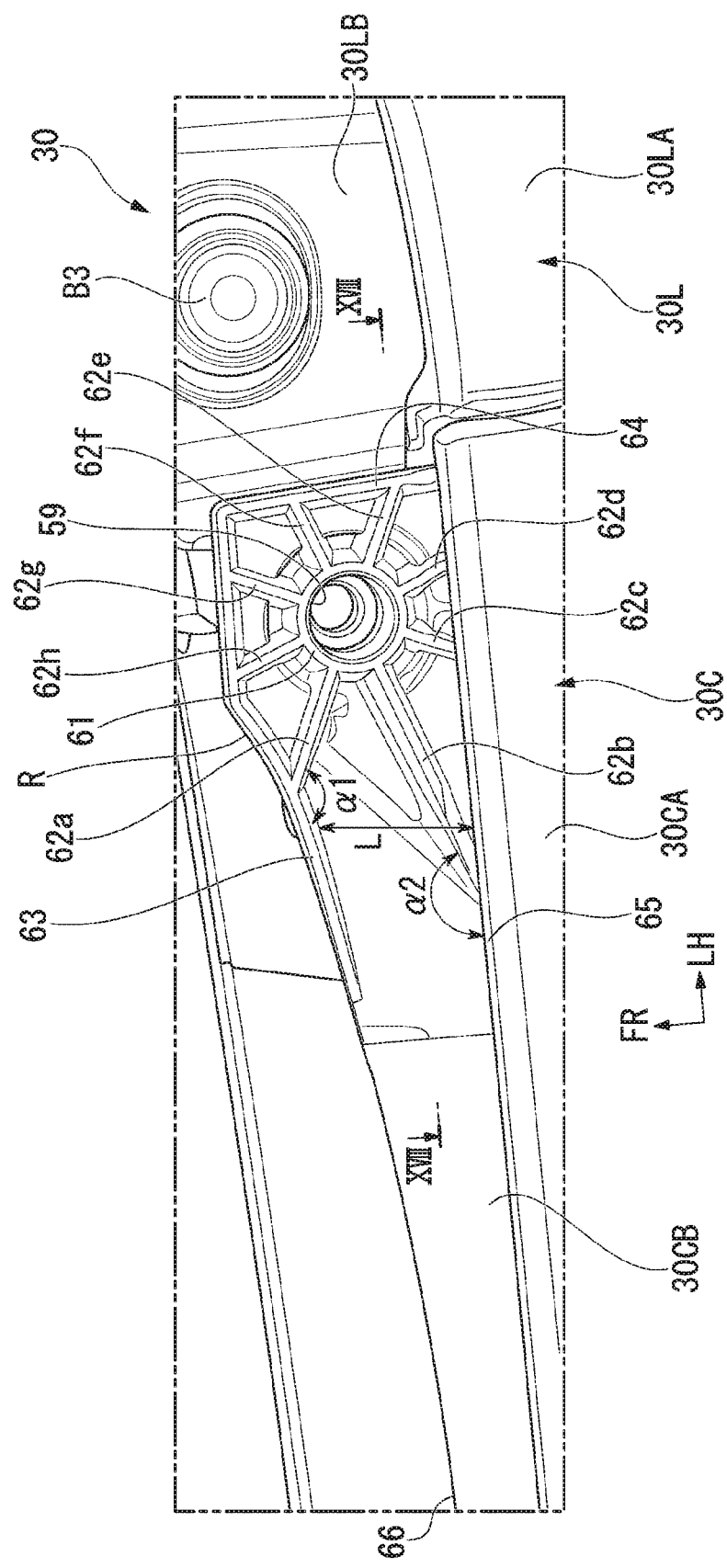
FIG. 17 is a perspective view of the rear bumper face seen from a vehicle body lower side according to the embodiment.
Figure 18:
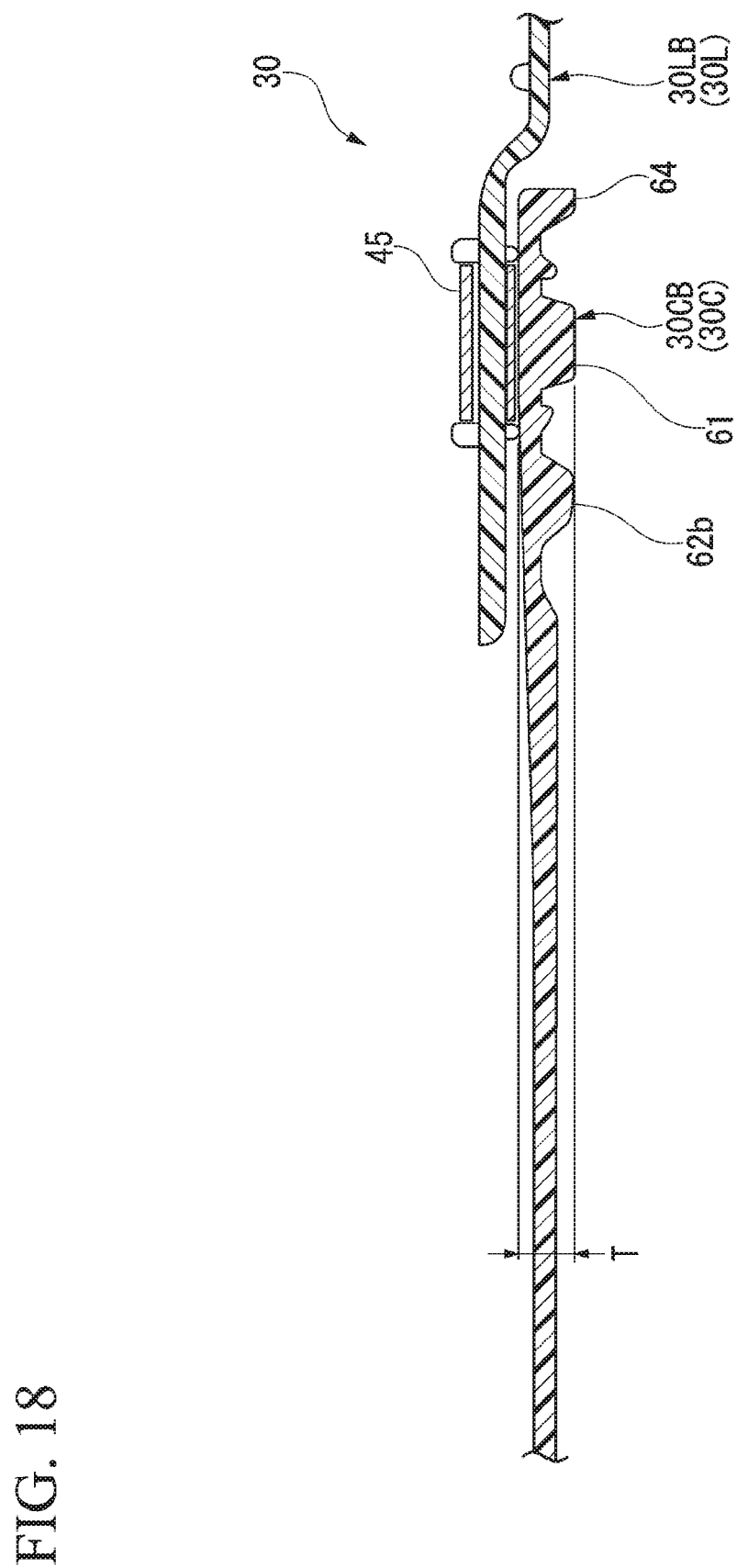
FIG. 18 is a cross-sectional view of the rear bumper face along a XVIII-XVIII line of FIG. 17 according to the embodiment.
Figure 19:
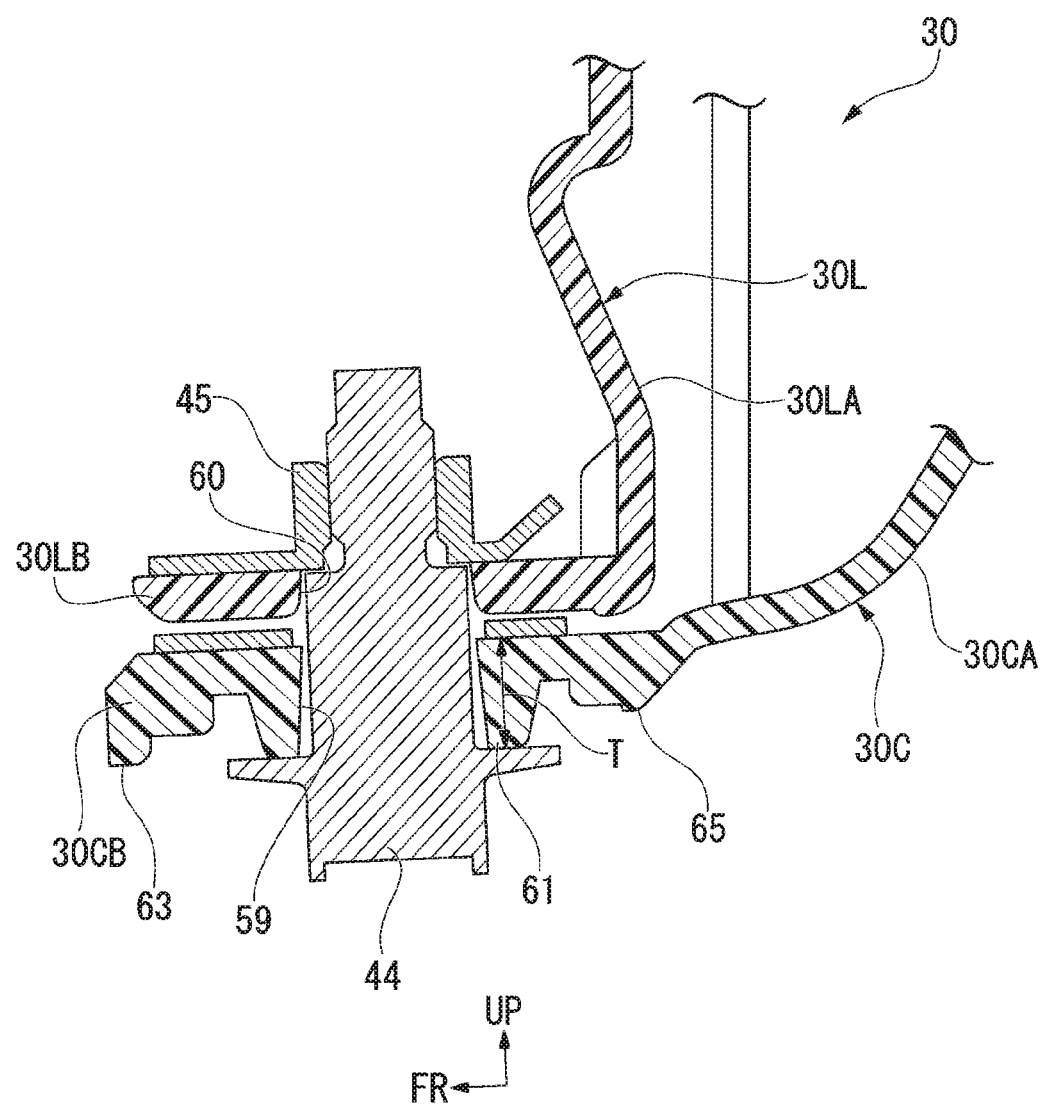
FIG. 19 is a cross-sectional view of the rear bumper face along a XIX-XIX line of FIG. 16 according to the embodiment.

FIG. 16 is an enlarged view showing a XVI part of FIG. 10 of the rear bumper face 30. FIG. 17 is a perspective view of the rear bumper face 30 seen from a vehicle body lower side. FIG. 18 is a cross-sectional view of the rear bumper face 30 along a XVIII-XVIII line of FIG. 17. FIG. 19 is a cross-sectional view of the rear bumper face 30 along a XIX-XIX line of FIG. 16.

As shown in FIG. 16 to FIG. 19, a side edge part of the lower flange 30CB of the middle face block 30C is overlapped on a lower surface of the lower flange 30LB of the side face block 30L and, in that state, is fastened and fixed to the side face block 30L by the bolt 44 and a clip nut 45. An insertion hole 59 in which a shaft part of the bolt 44 is inserted is formed on the lower flange 30CB of the middle face block 30C. An insertion hole 60 in which the shaft part of the bolt 44 is inserted is formed on the lower flange 30LB of the side face block 30L. The insertion hole 59 on the middle face block 30C side is formed so as to penetrate in the vertical direction in an outer region in the vehicle width direction of the lower flange 30CB. The insertion hole 59 constitutes a fastening fixation part of the lower flange 30CB on the middle face block 30C side. In the clip nut 45, a clip part is latched to the lower flange 30LB so as to sandwich the lower flange 30LB on the side face block 30L side.

As shown in FIG. 17, an annular rib 61 that expands downward so as to surround a circumferential area of the insertion hole 59, a plurality of radial ribs 62a, 62b, 62c, 62d, 62e, 62f, 62g, 62h that expand downward so as to extend from an outer surface of the annular rib 61 in a radial direction, a front edge rib 63 that expands downward so as to extend along a side at a vehicle body frontward position, and a side edge rib 64 that expands downward so as to extend along an outer side in the vehicle width direction are formed on a lower surface in an outer region in the vehicle width direction of the lower flange 30CB. A rear end raised part 65 that expands downward from a lower end of the block main body part 30CA is formed on a side at a vehicle body rearward position of the lower flange 30CB.

The two radial ribs 62a, 62b that are arranged closer to a middle position in the vehicle width direction than the annular rib 61 among the plurality of radial ribs that are formed on the lower surface of the lower flange 30CB are formed so as to continue to and form a blunt angle with any one of the front edge rib 63 and the rear end raised part 65. Specifically, one radial rib 62a continues to and forms an arbitrary blunt angle α1 with a part close to the middle position in the vehicle width direction of the front edge rib 63. Another radial rib 62b continues to and forms an arbitrary blunt angle α2 with a part close to the middle position in the vehicle width direction of the rear end raised part 65.

An injection gate trace 66 that remains after forming the lower flange 30CB according to injection molding using a resin material is arranged in the vicinity of a middle position in the vehicle width direction of the lower flange 30CB. Two radial ribs 62e, 62f are arranged on the lower flange 30CB at a position that is separated outward in the vehicle width direction across the annular rib 61 from the injection gate trace 66. A front end part of each of the two radial ribs 62e, 62f are connected to the side edge rib 64. Thereby, the two radial ribs 62e, 62f that partition a region which is farthest from the injection gate trace 66 around the annular rib 61 are joined directly to the side edge rib 64. Accordingly, the region which is sandwiched by the radial ribs 62e, 62f and which easily becomes a weld part at the time of injection molding of the lower flange 30CB is reinforced by the side edge rib 64.

In the lower flange 30CB of the middle face block 30C, an extension length L (refer to FIG. 17) toward the vehicle body frontward side from the rear end part and a maximum thickness T (refer to FIG. 18) in the vertical direction are gradually increased from a middle region in the vehicle width direction toward a formation region of the insertion hole 59 as a fastening fixation part with the side face block 30L. The lower flange 30CB is formed such that an upper surface as an overlapped surface with the lower flange 30LB of the side face block 30L is substantially flat. The maximum thickness T of the lower flange 30CB is gradually increased at a surface (lower surface side) on the opposite side of the overlapped surface. Specifically, in the present embodiment, a downward expansion height of the front edge rib 63, the radial ribs 62a, 62b, and the like is gradually increased toward the outside in the vehicle width direction.

As shown in FIG. 17, an end edge on a vehicle body frontward side of the lower flange 30CB is formed such that a shape is changed in an arc form from a middle region in the vehicle width direction toward the end region in which the insertion hole 59 is formed. An arc R that is drawn by the end edge on the vehicle body frontward side of the lower flange 30CB is an arc having an arc center at the frontward side of the middle region in the vehicle width direction of the lower flange 30CB. The arc R that is drawn by the end edge can be desirably an arc, for example, having a radius of 50 mm or more.

Figure 20A:
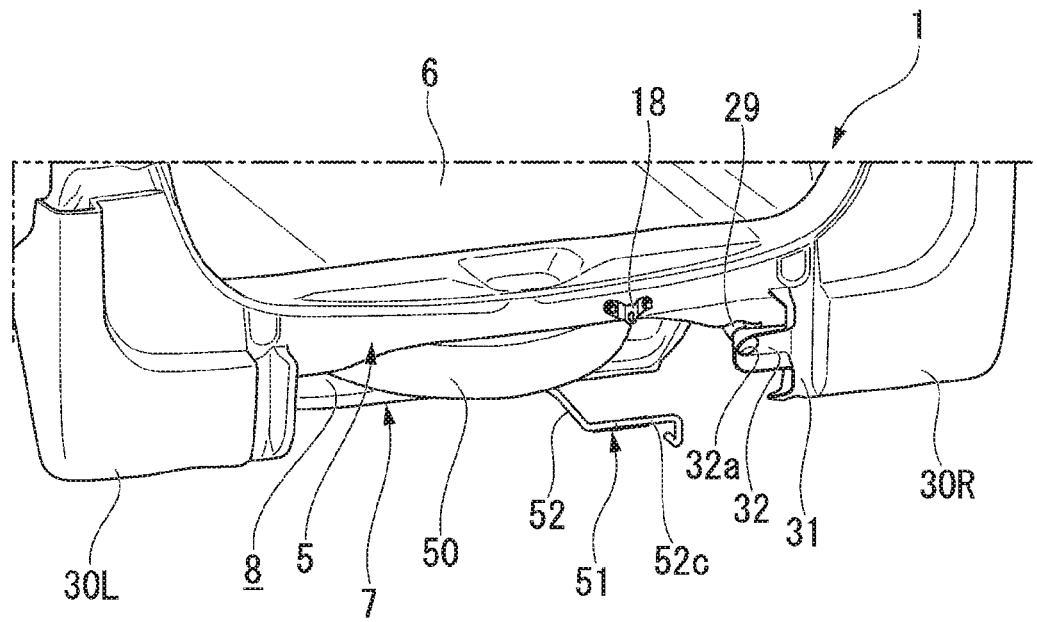
FIG. 20A is a perspective view of the vehicle rear part showing a release procedure of a vehicle spare tire according to the embodiment.
Figure 20B:
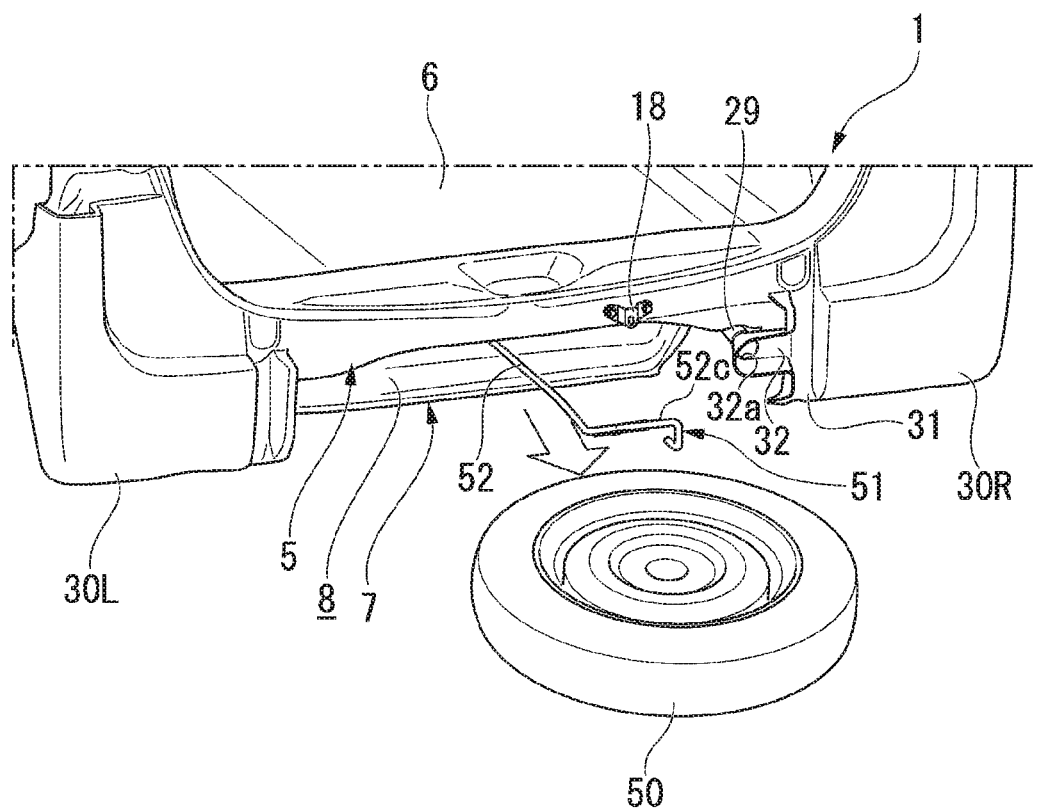
FIG. 20B is a perspective view of the vehicle rear part showing the release procedure of the vehicle spare tire according to the embodiment.

Next, an attaching/detaching method of the spare tire 50 in the vehicle 1 of the present embodiment is described. FIG. 20A and FIG. 20B are perspective views of the vehicle rear part showing a release procedure of the spare tire 50.

The spare tire 50 is laid sideways and is arranged on the tire carrier 51 in a state of being supported and suspended below the rear floor 6. At this time, the rear end part of the tire carrier 51 is latched and fixed by the rear end cross member 5 via the fixation rod 16.

When the spare tire 50 is removed from this state, first, only the middle face block 30C of the rear bumper face 30 is removed from the vehicle body. At this time, the bolt 55 is loosened, the fastening between the middle face block 30C and the rear panel 40 is released, the engagement between the middle face block 30C and the left and right side face blocks 30L, 30R is released, and the middle face block 30C is removed.

Then, the latch bolt 17 (refer to FIG. 4 and FIG. 6) is loosened by a tool, and the engagement between the fixation rod 16 and the latch part 52c of the tire carrier 51 is released. Thereby, the latch part 52c of the tire carrier 51 is removed from the vehicle body side.

As a result, the tire carrier 51 adopts a tilted attitude such that the rear end side is lowered as shown in FIG. 20A around the pivot part 52b on the front end side. At this time, the tire carrier 51 receives the weight of the spare tire 50 and is to be greatly tilted; however, when the tire carrier 51 is tilted to a certain angle, the lower surface of the tire carrier 51 comes into contact with the upper part of the differential mounted cross member 7. As a result, the tilt angle of the tire carrier 51 is regulated to the certain angle.

In this state, an operator inserts his hand into the tire accommodation part 8 from the vehicle body rearward direction and draws down the spare tire 50 in a rearward downward direction of the vehicle 1 along the upper surface of the tire carrier 51 as shown in FIG. 20B. Then, the operator performs an exchange operation and the like of the spare tire 50.

When the spare tire 50 is accommodated below the rear floor 6, according to a reverse procedure of the release procedure of the spare tire 50 described above, the spare tire 50 is arranged on the tire carrier 51, the rear part of the tire carrier 51 is lifted upward while maintaining that state, and the rear part of the tire carrier 51 is fixed to the vehicle body by using the fixation rod 16. Then, the middle face block 30C of the rear bumper face 30 is attached to the vehicle body.

As described above, in the rear bumper 100 of the present embodiment, at a part having a long extension length L to the vehicle body frontward side and having a thick maximum thickness T in the vertical direction, the lower flange 30CB of the middle face block 30C is fastened and fixed to the lower surface (lower surfaces of the lower flanges 30LB, 30RB) of the side face blocks 30L, 30R. Therefore, in the rear bumper 100 of the present embodiment, it is possible to fix each of left and right lower end regions of the middle face block 30C to a corresponding one of the side face blocks 30L, 30R with high rigidity.

Further, in the rear bumper 100 of the present embodiment, the maximum thickness T and the extension length L toward the vehicle body frontward side of the lower flanges 30LB, 30RB are gradually increased from the middle region in the vehicle width direction toward the insertion hole 59 side. Therefore, it is possible to maintain the strength and the rigidity in the vicinity of the insertion hole 59 where a bolt fastening is performed to be high, and it is possible to prevent a stress from concentrating on part of the lower flanges 30LB, 30RB at the time a load is externally input such as travel wind.

Accordingly, when the rear bumper 100 of the present embodiment is used, it is possible to fix the middle face block 30C to the side face blocks 30L, 30R with high rigidity while preventing a stress concentration in the vicinity of the fastening fixation part (insertion hole 59) of the middle face block 30C. Specifically, in a vehicle in which a space for mounting the spare tire 50 is present at a front side of the middle face block 30C like the vehicle 1 of the present embodiment, travel wind, rainwater, a stone on a road, or the like easily hits against the front surface side of the middle face block 30C at the time of high-speed travel, and therefore, the structure of the rear bumper 100 of the present embodiment is of benefit.

Further, the rear bumper 100 of the present embodiment is formed such that the shape of the end edge on the vehicle body frontward side of the lower flange 30CB of the middle face block 30C is changed in an arc form from the middle region in the vehicle width direction toward the insertion hole 59 (fastening fixation part) side. Therefore, when the rear bumper 100 of the present embodiment is employed, a stress does not easily occur at part of the lower flange 30CB at the time a load is externally input, and it is possible to efficiently reduce the weight of the middle region of the middle face block 30C while improving the strength and the rigidity of the middle face block 30C.

Further, in the rear bumper 100 of the present embodiment, the maximum thickness T of the lower flange 30CB of the middle face block 30C is increased at a surface (lower surface side) on the opposite side of the overlapped surface with the side face blocks 30L, 30R. Therefore, when this configuration is employed, it is possible to stably assemble the lower flange 30CB to the lower surface of the side face blocks 30L, 30R with good accuracy.

Further, in the present embodiment, the lower flange 30CB of the middle face block 30C includes: the rear end raised part 65 that expands downward along a side at a vehicle body rearward position; the front edge rib 63 that expands downward along a side at a vehicle body frontward position in an outer region in the vehicle width direction; the annular rib 61 that expands downward so as to surround the circumferential area of the insertion hole 59; and the plurality of radial ribs 62a, 62b, 62c, 62d, 62e, 62f, 62g, 62h that expand downward so as to extend from the annular rib 61 in a radial direction. Therefore, it is possible to enhance the strength and the rigidity of the outer region in the vehicle width direction of the lower flange 30CB by the rear end raised part 65, the front edge rib 63, the annular rib 61, and the radial ribs 62a, 62b, 62c, 62d, 62e, 62f, 62g, 62h.

Further, in the present embodiment, the radial ribs 62a, 62b that are arranged closer to a middle position in the vehicle width direction than the annular rib 61 continue to and form a blunt angle with any one of the front edge rib 63 and the rear end raised part 65. Therefore, it is possible to prevent a stress concentration on a connection part between the front edge rib 63 and the radial rib 62a and a connection part between the rear end raised part 65 and the radial rib 62b from occurring even when a large load acts on the lower flange 30CB between the middle region and the outer region in the vehicle width direction when the vehicle travels at high speed and the like.

Further, in the case of the structure of the present embodiment, it is possible to thin the thickness of the lower flange 30CB other than a part where the rear end raised part 65, the front edge rib 63, the annular rib 61, and the radial ribs 62a, 62b, 62c, 62d, 62e, 62f, 62g, 62h are arranged, and therefore, it is possible to further reduce the weight of the middle face block 30C.

Further, in the case of the structure of the present embodiment, when the middle face block 30C is formed by injection molding, it is possible to shorten a cooling time of a melt resin, and therefore, it is possible to shorten a cycle time of the injection molding and enhance production efficiency.

Further, in the rear bumper 100 of the present embodiment, the lower flange 30CB of the middle face block 30C includes the side edge rib 64 that expands downward along an outer side in the vehicle width direction and that is connected to the front edge rib 63. The two radial ribs 62e, 62f or more are arranged at a position that is separated outward in the vehicle width direction across the annular rib 61 from the injection gate trace 66 that is positioned in a middle region in the vehicle width direction of the lower flange 30CB, and the two radial ribs 62e, 62f or more are connected to the side edge rib 64. Therefore, at the time of injection molding of the lower flange 30CB, the melt resin that is injected via a gate flows toward an outer end part formation section from a middle region formation section of the lower flange 30CB of a molding tool. At this time, the melt resin merges at a rear side (an outer side in the vehicle width direction) of the annular rib 61 and easily becomes a weld part having low rigidity. However, the pair of the radial ribs 62e, 62f are connected to the side edge rib 64, and therefore, the decrease in the rigidity due to the weld part is supplemented. Accordingly, by employing the configuration described above, it is possible to prevent the decrease in the rigidity at the weld part of the lower flange 30CB of the middle face block 30C.

Further, in the rear bumper 100 of the present embodiment, the upper edge section of the block main body part 30CA of the middle face block 30C has the step portion 30Cb that is recessed in a step form to the vehicle body frontward side and that accepts the lower end of the tail gate 37 at the vehicle body rear part. The fastening hole 56 through which the bolt 55 for vehicle body fixation is inserted and the recess part 48 that is formed by the circumferential edge part of the fastening hole 56 being recessed to the vehicle body frontward side and that accepts the head part 55a of the bolt 55 are formed on the step portion 30Cb. Therefore, when the middle face block 30C is fixed to the vehicle body rear part by the bolt 55, even if the tail gate 37 is displaced in a closing direction, it is possible to prevent the tail gate 37 from interfering with the head part 55a of the bolt 55. Accordingly, when the configuration of the present embodiment is employed, it is possible to prevent damage at the tail gate 37 from occurring at the time of assembly of the middle face block 30C.

The present invention is not limited to the embodiment described above, and a variety of design changes can be made without departing the scope of the invention.

What is claimed is:

1. A vehicle rear bumper, comprising
a rear bumper face that is arranged at a vehicle rear part,
wherein the rear bumper face comprises: a pair of right and left side face blocks that are arranged at an outer position in a vehicle width direction; and a middle face block that is arranged at a middle position in the vehicle width direction,
an outer edge part in the vehicle width direction of the middle face block is fastened and fixed attachably and detachably to the right and left side face blocks,
the middle face block has a lower flange that extends in a vehicle body frontward direction from a lower end of a block main body part,
each of right and left edge parts of the lower flange is fastened and fixed to a lower surface of corresponding one of the right and left side face blocks, and
the lower flange is formed such that an extension length to the vehicle body frontward direction and a maximum thickness in a vertical direction are gradually increased from a middle region in the vehicle width direction toward a fastening fixation part with the side face block.

2. The vehicle rear bumper according to claim 1,
wherein an end edge on a vehicle body frontward side of the lower flange is formed such that a shape is changed in an arc form from a middle region in the vehicle width direction toward the fastening fixation part side.

3. The vehicle rear bumper according to claim 1,
wherein the maximum thickness of the lower flange is increased at a surface on an opposite side of an overlapped surface with the side face block.

4. The vehicle rear bumper according to claim 1,
wherein the lower flange comprises:
a rear end raised part that expands downward along a side at a vehicle body rearward position;

a front edge rib that expands downward along a side at a vehicle body frontward position in an outer region in the vehicle width direction;

an insertion hole which is formed in an outer region in the vehicle width direction and through which a fastening member is inserted;

an annular rib that expands downward so as to surround a circumferential area of the insertion hole; and a plurality of radial ribs that expand downward so as to extend from the annular rib in a radial direction, and the radial rib that is arranged closer to a middle position in the vehicle width direction than the annular rib of the lower flange is formed so as to continue to and form a blunt angle with any one of the front edge rib and the rear end raised part.

5. The vehicle rear bumper according to claim 4,
wherein the lower flange further comprises a side edge rib that expands downward along an outer side in the vehicle width direction and that is connected to the front edge rib, two or more of the radial ribs are arranged at a position that is separated outward in the vehicle width direction across the annular rib from an injection gate trace that is positioned in a middle region in the vehicle width direction of the lower flange, and the two or more of the radial ribs are connected to the side edge rib.

6. The vehicle rear bumper according to claim 1,
wherein an upper edge section of the block main body part of the middle face block has a step portion that is recessed in a step form to a vehicle body frontward side and that accepts a lower end of a tail gate at a vehicle body rear part that is openable and closable in a flip-up manner, and a fastening hole through which a fastening member for vehicle body fixation is inserted and a recess part that is formed by a circumferential edge part of the fastening hole being recessed to the vehicle body frontward side and that accepts a head part of the fastening member are formed on the step portion.

* * * * *